United States Patent
King et al.

(10) Patent No.: US 10,076,685 B2
(45) Date of Patent: Sep. 18, 2018

(54) OPERATIONS WITH INSTRUMENTED GAME BALL

(71) Applicant: InfoMotion Sports Technologies, Inc., Attleboro, MA (US)

(72) Inventors: Kevin William King, Columbus, OH (US); Mathew Anthony Tyson, Columbus, OH (US); Mark Joseph Davisson, Rensselaer, IN (US); John Joseph Knittle, Westerville, OH (US)

(73) Assignee: Russell Brands, LLC, Bowling Green, KY (US)

(*) Notice: Subject to any disclaimer, the term of this patent is extended or adjusted under 35 U.S.C. 154(b) by 46 days.

(21) Appl. No.: 14/411,938

(22) PCT Filed: Jul. 1, 2013

(86) PCT No.: PCT/US2013/048958
§ 371 (c)(1),
(2) Date: Dec. 30, 2014

(87) PCT Pub. No.: WO2014/008202
PCT Pub. Date: Jan. 9, 2014

(65) Prior Publication Data
US 2016/0001136 A1  Jan. 7, 2016

Related U.S. Application Data

(60) Provisional application No. 61/667,183, filed on Jul. 2, 2012, provisional application No. 61/667,178, filed
(Continued)

(51) Int. Cl.
*H02J 7/00* (2006.01)
*A63B 43/00* (2006.01)
(Continued)

(52) U.S. Cl.
CPC ............ *A63B 43/004* (2013.01); *A63B 15/02* (2013.01); *A63B 24/0021* (2013.01);
(Continued)

(58) Field of Classification Search
CPC ....... H02J 7/025; H02J 50/10; A63B 69/0071; A63B 43/004
(Continued)

(56) References Cited

U.S. PATENT DOCUMENTS 4,479,649 A   10/1984   Newcomb et al.
4,577,865 A   3/1986    Shishido
(Continued)

FOREIGN PATENT DOCUMENTS

CN   1524004   8/2004
CN   1814333   8/2006
(Continued)

OTHER PUBLICATIONS

U.S. Appl. No. 61/028,823, filed Feb. 2008, Crowley.
(Continued)

*Primary Examiner* — Edward Tso
*Assistant Examiner* — Aaron Piggush
(74) *Attorney, Agent, or Firm* — Bradley Arant Boult Cummings, LLP; Jacob W Neu; Nathan W Johnson

(57) ABSTRACT

This document provides a computer-implemented method that includes placing an athletic ball containing a battery on an inductive charging device; generating an electric or magnetic field, or both with the inductive charging device; receiving energy from the field or fields via a receptor located inside the athletic ball; and charging a battery inside the athletic ball using the received energy. This document also provides devices and methods for detecting events with
(Continued)

an instrumented player-controllable game device, such as an event of a basketball or soccer ball passing through a goal.

14 Claims, 16 Drawing Sheets

Related U.S. Application Data on Jul. 2, 2012, provisional application No. 61/711,186, filed on Oct. 8, 2012, provisional application No. 61/793,206, filed on Mar. 15, 2013.

(51) Int. Cl.
| | |
|---|---|
| *H02J 50/90* | (2016.01) |
| *H02J 50/10* | (2016.01) |
| *H02J 50/60* | (2016.01) |
| *H02J 50/40* | (2016.01) |
| *A63B 69/00* | (2006.01) |
| *A63B 15/02* | (2006.01) |
| *A63B 41/00* | (2006.01) |
| *A63B 45/00* | (2006.01) |
| *A63B 24/00* | (2006.01) |
| *H01Q 1/22* | (2006.01) |

(52) U.S. Cl.
CPC .............. *A63B 41/00* (2013.01); *A63B 45/00* (2013.01); *A63B 69/0071* (2013.01); *H02J 50/10* (2016.02); *H02J 50/40* (2016.02); *H02J 50/60* (2016.02); *H02J 50/90* (2016.02); *A63B 2024/0034* (2013.01); *A63B 2220/10* (2013.01); *A63B 2220/30* (2013.01); *A63B 2220/34* (2013.01); *A63B 2220/35* (2013.01); *A63B 2220/40* (2013.01); *A63B 2220/80* (2013.01); *A63B 2225/20* (2013.01); *A63B 2225/50* (2013.01); *A63B 2243/0025* (2013.01); *A63B 2243/0037* (2013.01); *H01Q 1/2225* (2013.01)

(58) Field of Classification Search
USPC .......................... 320/107, 108, 115; 473/570
See application file for complete search history.

(56) References Cited

U.S. PATENT DOCUMENTS

| | | | |
|---|---|---|---|
| 4,595,200 | A | 6/1986 | Shishido |
| 4,776,589 | A | 10/1988 | Yang |
| 5,102,131 | A | 4/1992 | Remington |
| 5,236,383 | A | 8/1993 | Connelly |
| 5,609,411 | A | 3/1997 | Wang |
| 5,779,576 | A | 7/1998 | Smith et al. |
| 5,810,685 | A | 9/1998 | Willner et al. |
| 6,013,007 | A | 1/2000 | Root et al. |
| 6,148,271 | A | 11/2000 | Marinelli |
| 6,196,932 | B1 | 3/2001 | Marsh et al. |
| 6,251,035 | B1 | 6/2001 | Fa |
| 6,565,449 | B2 | 5/2003 | Buhler |
| 6,582,330 | B1 | 6/2003 | Rehkemper et al. |
| 6,671,390 | B1 | 12/2003 | Barbour et al. |
| 6,744,375 | B1 | 6/2004 | Groos |
| 6,757,572 | B1 | 6/2004 | Forest |
| 6,856,934 | B2 | 2/2005 | Vock et al. |
| 7,014,581 | B2 | 3/2006 | Ng |
| 7,021,140 | B2 | 4/2006 | Perkins |
| 7,072,789 | B2 | 7/2006 | Vock et al. |
| 7,092,846 | B2 | 8/2006 | Vock et al. |
| 7,162,392 | B2 | 1/2007 | Vock et al. |
| 7,192,387 | B2 | 3/2007 | Mendel |
| 7,234,351 | B2 | 6/2007 | Perkins |
| 7,273,431 | B2 | 9/2007 | DeVall |
| 7,308,818 | B2 | 12/2007 | Considine et al. |
| 7,625,314 | B2 | 12/2009 | Ungari et al. |
| 7,643,895 | B2 | 1/2010 | Gupta et al. |
| 7,813,821 | B1 | 10/2010 | Howell |
| 7,891,666 | B2 | 2/2011 | Kuenzler et al. |
| 8,070,654 | B2 | 12/2011 | Chapa, Jr. et al. |
| 8,078,478 | B2 | 12/2011 | Fleming et al. |
| 8,083,646 | B2 | 12/2011 | Chapa, Jr. et al. |
| 8,086,421 | B2 | 12/2011 | Case, Jr. et al. |
| 8,109,858 | B2 | 2/2012 | Redmann |
| 8,112,251 | B2 | 2/2012 | Case, Jr. et al. |
| 8,128,410 | B2 | 3/2012 | Prstojevich |
| 8,152,695 | B2 | 4/2012 | Riley et al. |
| 8,172,722 | B2 | 5/2012 | Molyneux et al. |
| 8,206,219 | B2 | 6/2012 | Shum et al. |
| 8,231,487 | B2 | 7/2012 | Nurnberg et al. |
| 8,231,506 | B2 | 7/2012 | Molyneux et al. |
| 8,517,870 | B2 | 8/2013 | Crowley et al. |
| 8,540,560 | B2 | 9/2013 | Crowley et al. |
| 8,579,632 | B2 | 11/2013 | Crowley |
| 8,597,095 | B2 | 12/2013 | Crowley et al. |
| 8,663,040 | B2 | 3/2014 | Kortegast |
| 8,951,106 | B2 | 2/2015 | Crowley et al. |
| 2003/0207718 | A1 | 11/2003 | Perlmutter |
| 2003/0224885 | A1 | 12/2003 | Leal et al. |
| 2003/0228934 | A1 | 12/2003 | Corzilius et al. |
| 2005/0069853 | A1 | 3/2005 | Tyson et al. |
| 2005/0288133 | A1 | 12/2005 | Rudell |
| 2006/0025282 | A1 | 2/2006 | Redmann |
| 2006/0135297 | A1 | 6/2006 | Cruciani |
| 2006/0148594 | A1 | 7/2006 | Saintoyant et al. |
| 2006/0189386 | A1 | 8/2006 | Rosenberg |
| 2007/0021244 | A1 | 1/2007 | Ko |
| 2007/0026975 | A1 | 2/2007 | Marty et al. |
| 2007/0281811 | A1 | 12/2007 | Wang |
| 2008/0015064 | A1 | 1/2008 | Nelson et al. |
| 2008/0026877 | A1 | 1/2008 | Neel |
| 2008/0139307 | A1 | 6/2008 | Ueshima et al. |
| 2009/0029754 | A1 | 1/2009 | Slocum et al. |
| 2009/0047645 | A1 | 2/2009 | Dibenedetto et al. |
| 2009/0048044 | A1 | 2/2009 | Oleson et al. |
| 2009/0048070 | A1 | 2/2009 | Vincent et al. |
| 2009/0189982 | A1 | 7/2009 | Tawiah |
| 2009/0210078 | A1 | 8/2009 | Crowley |
| 2009/0298650 | A1 | 12/2009 | Kutliroff |
| 2009/0325739 | A1 | 12/2009 | Gold |
| 2010/0048302 | A1 | 2/2010 | Lutnick et al. |
| 2010/0053324 | A1 | 3/2010 | Kim et al. |
| 2010/0069181 | A1 | 3/2010 | Lin |
| 2010/0105480 | A1 | 4/2010 | Mikhailov et al. |
| 2010/0130315 | A1 | 5/2010 | Steidle |
| 2010/0184563 | A1 | 7/2010 | Molyeux et al. |
| 2010/0285903 | A1 | 11/2010 | Nicodem |
| 2011/0077112 | A1 | 3/2011 | Erario et al. |
| 2011/0118062 | A1* | 5/2011 | Krysiak ................. A63B 41/02 473/570 |
| 2011/0220634 | A1 | 9/2011 | Yeh |
| 2011/0316529 | A1* | 12/2011 | Stancil ............... A63B 24/0021 324/207.22 |
| 2012/0029666 | A1 | 2/2012 | Crowley |
| 2012/0058845 | A1 | 3/2012 | Crowley |
| 2012/0129138 | A1 | 5/2012 | Redmann |
| 2012/0231906 | A1 | 9/2012 | Barry et al. |
| 2012/0244969 | A1* | 9/2012 | Binder .................. A63H 33/18 473/570 |
| 2013/0079906 | A1 | 3/2013 | Crowley et al. |
| 2014/0031151 | A1 | 1/2014 | Crowley |
| 2014/0039651 | A1 | 2/2014 | Crowley |
| 2014/0081436 | A1 | 3/2014 | Crowley et al. |

FOREIGN PATENT DOCUMENTS

| | | |
|---|---|---|
| CN | 101367013 | 2/2009 |
| EP | 1 637 192 | 3/2006 |
| JP | 2007-014671 | 1/2007 |
| KR | 10-1988-0001317 | 4/1988 |
| KR | 2000055834 | 9/2000 |
| KR | 2001008367 | 2/2001 |
| WO | WO 1995/034351 | 12/1995 |
| WO | WO 1999/016511 | 4/1999 |

(56) References Cited

FOREIGN PATENT DOCUMENTS

| WO | WO 2009/102813 | 8/2009 |
|---|---|---|
| WO | WO 2010/111705 | 9/2010 |
| WO | WO 2012/033732 | 3/2012 |

OTHER PUBLICATIONS

U.S. Appl. No. 61/164,277, filed Mar. 2009, Crowley.
U.S. Appl. No. 61/249,526, filed Oct. 2009, Crowley.
"Built-in Speed Sensor Records How Fast You Throw the Ball—Used As a Training Aid for Pitchers," Markwort Sporting Goods Company [online], [retrieved on May 22, 2012] Retrieved from the Internet:<URL: http://www.markwort.com/featured/speedsensor.asp>.
"Intelligent Basketball Tracks Trajectory," Freescale [online] [retrieved on May 23, 2012]. Retrieved from the Internet: <URL: http://www.freescale.com/webapp/sps/site/overview.jsp?code=CASE_STUDY_INTELLIGENT_BASKETBALL>, 2 pages.
"Speed Sensor™ Programmable Balls," Markwort [online], [retrieved on May 25, 2012]. Retrieved from the Internet: <URL: http://www.markwort.com/featured_tab/speedsensor_big.asp>, 2 pages.
Hsu, Michael. "Gear & Gadgets: Making Sense of Your Swing, Turn Your Golf Glove Into a High-Tech Coach." The Wall Street Journal, Aug. 4-5, 2012. (1 page).
Murray, "Freescale Rolls Out World's First 'Intelligent Basketball," Design News Blog, Jun. 29, 2007 [retrieved May 22, 2012] Retrieved from the Internet:<URL: http://www.designnews.com/author.asp?section_id=1386&doc_id=215078&print=yes>.
Authorized Officer D. Kim, International Search Report and Written Opinion for PCT/US2010/029068, dated Oct. 21, 2010, 13 pages.
Authorized Officer RA Kwang Pyo, International Search Report/Written Opinion in PCT/US2009/033831 dated Sep. 24, 2009, 11 pages.
Authorized Officer S. Baharlou, International Preliminary Report on Patentability for PCT/US2010/029068, dated Oct. 6, 2011, 9 pages.
Authorized Officer Y. Cussac, International Preliminary Report on Patentability in PCT/US2009/033831, dated Aug. 26, 2010, 6 pages.
International Search Report and Written Opinion in International Application No. PCT/US2011/050498, dated Apr. 25, 2012, 9 pages.
International Preliminary Report on Patentability in International Application No. PCT/US2011/050498, dated Mar. 12, 2013, 6 pages.
International Search Report and Written Opinion in International Application No. PCT/US2013/048958, dated Sep. 27, 2013, 15 pages.
International Search Report and Written Opinion in International Application No. PCT/US2013/048649, dated Oct. 22, 2013, 10 pages.
Extended European Search Report in EP Application No. 11824001.9, dated Apr. 3, 2014, 6 pages.
International Preliminary Report on Patentability in International Application No. PCT/US2013/048649, dated Jan. 6, 2015, 7 pages.
International Preliminary Report on Patentability in International Application No. PCT/US2013/048958, dated Jan. 15, 2015, 12 pages.

\* cited by examiner

US 10,076,685 B2

OPERATIONS WITH INSTRUMENTED GAME BALL

CROSS-REFERENCE TO RELATED APPLICATIONS

This application is a National Stage application under 35 U.S.C. § 371 of International Application No. PCT/US2013/048958, having and International Filing Date of Jul. 1, 2013, which claims the benefit of U.S. Provisional Application Ser. 61/667,183, filed Jul. 2, 2012; U.S. Provisional Application Ser. No. 61/667,178, filed Jul. 2, 2012; U.S. Provisional Application Ser. No. 61/711,186, filed Oct. 8, 2012 and U.S. Provisional Application Ser. No. 61/793,206, filed Mar. 15, 2013. The disclosure of the prior applications are considered part of (and are incorporated by reference in) the disclosure of this application.

TECHNICAL FIELD

This document relates to systems and techniques for operating an instrumented game device that can be handled by a user, such as a basketball or soccer ball that has motion sensors and other electronics mounted in and/or on the device.

BACKGROUND

Athletics has become an integral part of society, with multiple television channels dedicated to sporting events, with professional athletes promoting all sorts of products, and with the public holding star athletes—both amateur and professional—in high regard, so as to support financial rewards such as college scholarships, sponsorship opportunities, and other revenue-generating careers. Millions of people watch professional and collegiate athletic events on any given night, and hundreds of millions or billions watch major events like the Super Bowl, Final Four, the soccer World Cup, and other championships.

As a result, athletes can make large sums of money, as can the teams and others that support them. The relative increase in importance of athletics has been accompanied by attempts to increase athletic performance at all levels of development, from young children to professionals. Many such techniques depend on personal, subjective review of an athlete's performance and skills, and thus can suffer from observer bias and other similar issues. Also, many factors for athletic performance are too subtle for human observance.

SUMMARY

This document describes systems and techniques that may be used in combination with an instrumented human-manipulable sporting device such as a soccer ball or basketball. In particular, the techniques described here relate to support that may be provided for instruments that are located in or on such sporting devices, such as sensor assemblies located in a ball for measuring movement (e.g., gyros and accelerometers) of, and magnetic fields around, such devices. Data generated by such components can be used in a variety of ways, such as to compare one athlete's performance to the performance of other athletes (whose performance metrics based on ball motion data may be stored in a central database), to provide data in association with entertainment (such as showing motion-derived statistics or other data overlaid on the screen of a television of a sporting event that is in progress), or in using motion data to affect the play of a videogame, such as by using motion data from a person to affect the manner in which his or her avatar performs in a videogame.

In one example, inductive charging of electronics in a ball may occur from a dock onto which the ball may be placed. The dock may include one or more electrically-charged primary coils that establish an electrical and magnetic field above the dock and coil(s), while the ball may be provided with one or more secondary coils that are sized, shaped, and arranged to have inductive current created in them by the dock. For example, one or more metallic coils may be imprinted on or in a rubber bladder for a ball, in a position so that an electrical current is induced in the coils when they are placed above a charging station. In another example, the secondary coil may be made from a flexible printed circuit board that can be installed between the construction layers of a ball. In some embodiments that use a single secondary coil, the ball may need to be positioned on the charging station in a particular orientation to achieve efficient inductive coupling between the primary and secondary coils—and the outside of the ball may be imprinted with indications (e.g., arrows pointing in the appropriate direction, or a drawing of the ball properly positioned) or instructions to cause a user to position the ball properly.

In some embodiments, multiple such coils may be located around the ball so that the ball is not required to be positioned at a particular angle, but can simply be dropped on the dock or other portable charging or detection device (which may be in the form of a standard rolling basketball rack that can hold multiple balls, or in another appropriate form). The dock or other portable charging or detection device may also include wireless communications capabilities and electronics for initiating communication with any ball placed in the dock, so as to read data off such a ball, to identify the ball, and to cause the ball to erase its memory of such data so as to make room for additional data.

In another example, this document describes systems and techniques that may be used to identify certain events relating to a player manipulable item, such as a game ball. In the examples described herein, instrumentation and sensors may be provided in a game ball or similar item (e.g., hockey puck), including sensors for identifying the presence of metallic objects near or around the item. As one example, electronics in a ball (e.g., applied to or in the bladder of an inflatable ball) may be electrically energized, and sensors may sense an electric field created by such energizing. When the ball passes by a metallic object, such as the ring of a basketball hoop, the field can be affected, and such affectation can be sensed with the sensors. When the signature of the change reflects a change that is known to relate to the ball passing through the ring of the hoop (perhaps by the magnetic data alone, or in combination with other data, such as accelerometer or gyro data that indicates a player recently released the ball in the form of a shot, or slammed it down in the form of a dunk, and also in combination with after-occurred data, such as a sudden but soft deceleration and change in rotation that is indicative of the ball "swishing" through the net in basketball), the ball can record an event that is associated with a made shot (e.g., by storing a flag that relates to such an event along with a clock time for the event). The ball may then communicate that data—either immediately while the ball is being used, or later such as when the ball is laid in an inductive charging cradle that also includes wireless or wired data communication capabilities for communicating with the electronics inside the ball.

As another example, coils can be located in the ball to sense the earth's magnetic field. That is, the coils can be configured to sense the far-field electromagnetic field emanating from the earth. In addition, the coils of the ball are able to sense disturbances to the far-field signals, and those disturbances can be correlated to information about objects in close proximity to the ball. For example, when the ball is close to a ferromagnetic (e.g., steel) basketball rim, the coils of the ball will sense a disturbance in the magnetic field signal. The near-field signature of the ball being close to the basketball rim, but not passing through the rim will be detectably different from the near-field signature of the ball passing through the rim. Thus, the magnetic field signals received by the coils can be correlated to whether a goal was made or missed.

Through such mechanisms or other mechanisms, such as by Wi-Fi or Bluetooth wireless data connections, associated electronics in the ball may be paired with a communication and/or computing device such as a smartphone or tablet computer. A sensor unit in the ball may have a pairing table memory that stores several previously paired Bluetooth- or other-enabled devices. An application installed on such a device, such as an application downloaded to the device from an application stored, can be purchased or obtained for free, and may provide for enhanced interactivity with such a ball. For example, an athlete may charge a ball on a charging base or dock, and may at that time or another time pair the ball or the dock with a smartphone. The athlete may, after charging the electronics in the ball, perform a number of predetermined, instructed (e.g., from a web site or an app on their smartphone) drills, such as dribbling (e.g., regular dribbling, crossovers, etc.) and shooting drills (e.g., set shots and jump shots from various locations and distances). While the drills are being performed, the ball may collect motion data and may partially process the data into a usable form by employing on-board processing algorithms and circuitry. (The ball may turn on automatically upon sensing a certain number of hard bounces, and may turn off automatically when placed in a charging base or dock, or upon the expiration of a predetermined time without a hard bounce, e.g., an acceleration similar to a bouncing of the ball on a hard floor, like in a typical dribble). During the drills or upon completion of the drills, the data may be transmitted in whole or in part of the smartphone or other device, and a user may employ a GUI on the device to ascertain his or her performance, including by seeing his or her performance compared to one or more (e.g., aggregated or individual) other players of like skill levels. Such an application may also communicate with a server system, and may provide grades or other scores on aspects of the athlete's performance in particular aspects of the drills, and may also provide targeted recommendations for improving performance in certain aspects of the athlete's game.

In certain implementations, such systems and technique may provide one or more advantages. For example, an instrumented ball can be provided and can be recharged conveniently and inexpensively by a user. Multiple such balls may also be charged in a similar manner, such as when used for practices for an entire team. Communication to and from the balls may also occur simultaneously with such inductive charging. The use of inductive charging techniques enables the balls to be watertight and have no exposed electrical connectors, while still allowing for charging of a battery or other electrical energy storage mechanism internal to the ball. Further, more complete and accurate statistics may be maintained by a system, in that the precise time of a basket being scored may be determined (to small fractions of a second), and shot hang time can also be computed by subtracting from such a "made" time, a time at which motion sensor data indicates that the ball left a player's hand. Moreover, automatic scoring and statistics gathering systems may be employed and may be less expensive than all-human systems and provide greater accuracy and precision. Such hoop sensing as described here may play a role in a larger system by gathering data about the relative score of a game (and may be integrated with the game clock to automatically determine, for example, whether the shot was a free throw or a regular shot—and referring may be provided a remote control with a button they press when raising their hands to indicate a three-point shot). With such a system, the role of scorer may also be assigned to one of the game officials, making the administration of a game easier (fewer people who have to be located) and less expensive.

In one implementation, a computer-implemented method is disclosed that comprises placing an athletic ball containing a battery on an inductive charging device; generating an electric or magnetic field, or both with the inductive charging device; receiving energy from the field or fields via a receptor located inside the athletic ball; and charging a battery inside the athletic ball using the received energy. The method can also comprise transmitting data wirelessly from the ball in response to sensing the inductive charging device. The inductive charging device can have a receptacle on its top surface sized to hold the ball from rolling when the ball is placed in the receptacle.

In certain aspects, the receptor comprises one or more coils mounted in a periphery of the ball. The one or more coils can be imprinted on a layer that makes out a periphery of the athletic ball, and can include a plurality of coils in different hemispheres of the ball so as to enable charging of the battery when the ball is at different rotational angles in relation to the inductive charging device. The method can also comprise measuring an electric or magnetic field around the ball when the ball is away from the inductive charging device. In some implementations, the one or more coils mounted in the periphery of the athletic ball are formed integrally with a flexible circuit board.

In another general aspect, an athletic game ball is provided herein. The athletic game ball comprises a multi-layer ball shell sealed from an area around the ball shell; one or more electronic sensors located within a periphery of the ball; and one or more inductive electric secondary charging coils located in the ball shell or on an interior surface of the ball shell and connected to provide electrical energy to one or more energy storage devices connected to supply power for operating the one or more sensors.

In various implementations, the athletic game ball may further comprise a circuit board supporting the electronic sensors and associated circuitry for monitoring motion of the game ball. The associated circuitry may comprise a wireless communication chip or chip set. The one or more inductive charging coils may be connected to serve as antennas for the wireless communication chip or chip set. The associated circuitry may be programmed to begin transmitting data stored in the ball upon detecting that the ball has been docked into a charging station. The one or more sensors may comprise (i) an accelerometer, (ii) a magnetometer or angular rate sensor, and (iii) near field communications sensor to identify the ball as it relates to other devices detected in close vicinity. The one or more inductive charging coils may be positioned so that the ball can be charged when set at any angle in a charging base that contacts or almost contacts only portions in one hemisphere of the ball. The athletic ball may further comprise one or more inductive electric primary charging coils configured to wirelessly transmit electric power to the one or more inductive electric secondary charging coils when the coils are placed in close proximity to each other. The inductive electric primary charging coils may be located in a charging base arranged to receive the ball without the ball readily rolling off of the charging base. The one or more inductive electric secondary coils may be imprinted on a layer from which a shell of the ball is constructed. The one or more inductive electric secondary coils may include a plurality of coils in different hemispheres of the ball so as to enable charging of the battery when the ball is at different rotational angles in relation to a charging base. The one or more inductive electric secondary coils may be formed integrally with a flexible printed circuit board. The associated electronics may be programmed to identify perturbations in an electric or magnetic field around the ball so as to identify when the ball has passed near a gaming goal.

In another general aspect, a method of constructing an instrumented athletic game ball is provided herein. The method comprises: providing an electronics receptor in an interior volume of a ball bladder layer that is part of a periphery of the game ball; applying one or more inductive charging coils to a layer that is part of the periphery of the game ball; connecting the one or more inductive charging coils to an electronic sensor package; and inserting the electronic sensor package into the electronics receptor so that the electronics sensor package is within the periphery of the game ball.

In various implementations, the one or more inductive charging coils may be applied to the ball bladder or other layers of the ball construction. The electronics may be attached to the inductive charging coil before the inductive charging coil is applied to the layer that is part of the periphery of the game ball. The electronics may be attached to the inductive charging coil after the inductive is applied to the layer that is part of the periphery of the game ball. At least one of the one or more inductive charging coils may be located to surround a hole in the ball bladder at a location of the electronics receptor. The method may further comprise, after applying the one or more inductive charging coils to the layer, applying windings around the bladder. The electronics sensor package may include a battery for powering components of the electronics sensor package and for receiving electrical charging power from the inductive charging coil. The one or more inductive charging coils may be connected to the electronic sensor package before the one or more inductive charging coils are applied to the layer that is part of the periphery of the game ball. The method may further comprise testing charging of the electronics sensor package via the one or more inductive charging coils to verify proper operation of the game ball. The test may occur by applying a defined charging action to the ball and determining a relative change in charge of the electronics sensor package in response to the defined charging operation.

In another general aspect, a computer-implemented method is provided herein. The computer-implemented method comprises: identifying, with a computer system, data captured from sensors positioned to sense a magnetic field around, created by, or affected by a sporting device as part of an actual sporting event; analyzing the data with the computer system to identify a temporary change in a field around the sporting device that is indicative of a scoring event using as part of the sporting event the sporting device; and registering the occurrence of a scoring event in response to the analyzing.

In various implementations, identifying data captured form the sensors may comprise streaming data wirelessly from the sporting device to a wireless access point as the sporting device captures more data about the sporting event. Streaming data wirelessly from the sporting device may comprise essentially simultaneously streaming data that indicates motion of the sporting device and data that represents a field around the sporting device. Analyzing the data may comprise identifying a disruption of defined magnitude in a magnetic field around the sporting device. The sporting device may be an inflatable ball and the field around the sporting device may be created by electronics within the sporting device. The sporting device may be an inflatable ball and the field may be created by application of electrical energy to a goal through which the sporting device passes. The sporting device may be an inflatable ball and the field around the sporting device may be the magnetic field of the earth. The sensors may comprise electrically conductive devices applied in or on a bladder or shell or both of the sporting device. The computer-implemented method may further comprise using the electronically conductive devices to provide inductive charging to electronics inside the ball and through a shell of the ball.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for features that can be implemented as part of an instrumented human-manipulatable game device, such as a soccer ball, basketball, football, a hockey puck, a golf ball, baseball, volleyball, or the like. In one example, coils or other structures can be provided in a ball and may induce a current when the ball is placed near an inductive charging pad, so as to charge rechargeable batteries in the ball.

Figure 1A:
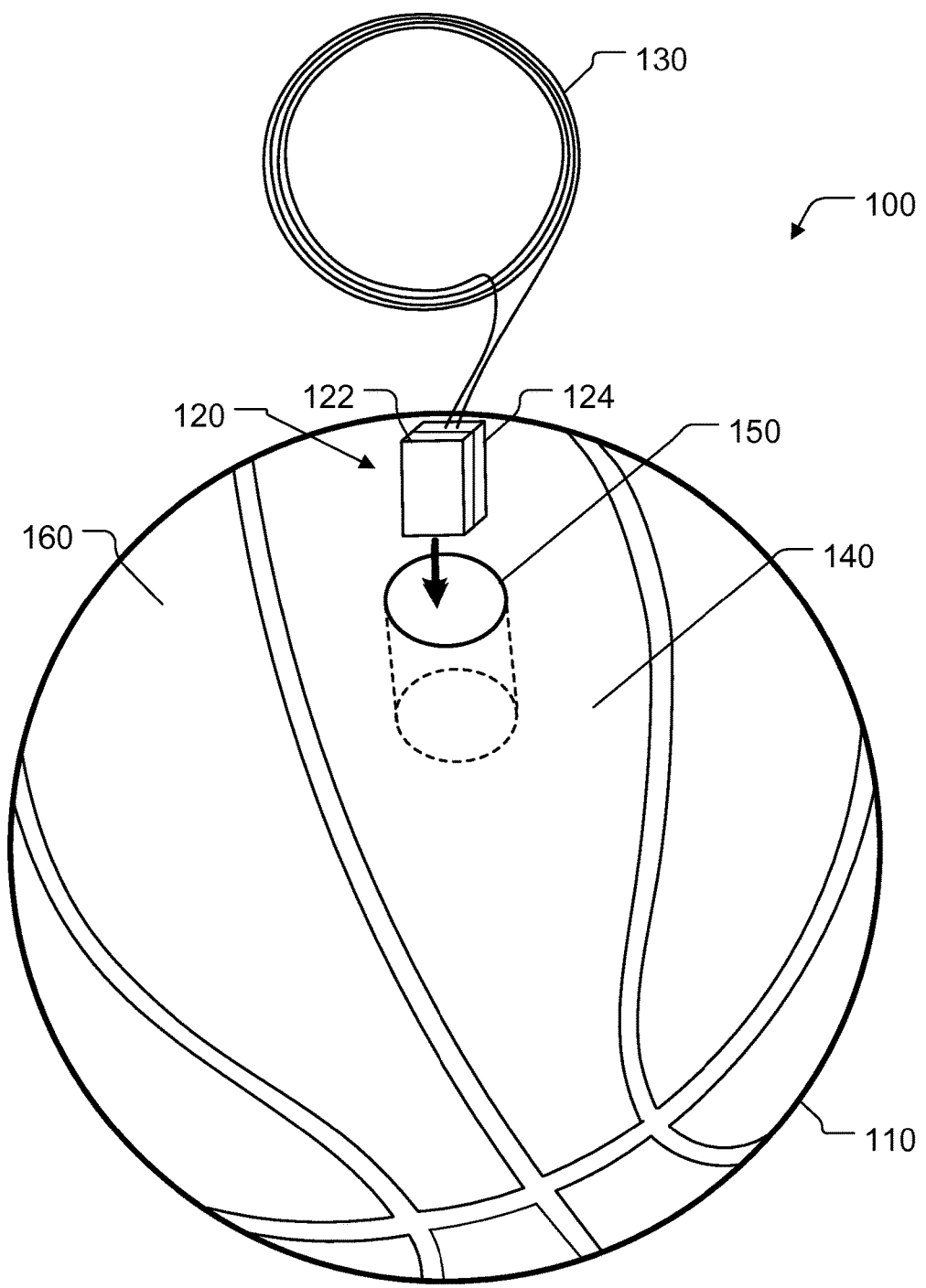
FIG. 1A shows an exploded perspective view of an example instrumented sports ball with a secondary coil for an inductive charging system.

FIG. 1A shows an exploded perspective view of an example instrumented sports ball 100 that is equipped to be inductively charged. In general, the sports ball 100 includes a multi-layer ball shell 110 or periphery, an electronics pack 120, and a secondary coil 130. As described further below, the electronics pack 120 can be placed in a pocket 150 that can be constructed as an integral part of the ball shell 110. The secondary coil 130 can be disposed between the layers of construction of the ball shell 110—such as on top of the carcass layer 140 but beneath the skin panels (not shown). When the electronics pack 120 and the secondary coil 130 are so installed, the instrumented sports ball 100 can look like and function like an ordinary sports ball—because the secondary coil 130 and electronics pack 120 are contained and hidden within the ball shell 110 in a manner that does not appreciably effect the typical playability performance of the sports ball 100.

A basketball is provided here as an example embodiment of an instrumented sports ball 100, but the systems and techniques provided here can be applied to a variety of sporting devices, e.g. soccer balls, footballs, hockey pucks, golf balls, baseballs, volleyballs, or the like. For ease of description and understanding, the instrumented sports ball 100 may be alternately referred to herein, in a non-limiting sense, as basketball 100. In some embodiments, basketball 100 can be a standard full-size basketball having an inflated circumference of about 29.5 inches. As another example, basketball 100 can be a standard mid-size basketball having an inflated circumference of 28.5 inches. The provided instrumented basketball 100 shares many other characteristics in common with a standard basketball. For example, the ball shell 110 can be constructed from multiple layers of material. The outermost layer of the example basketball 100 can include the generally recognizable skin panels 160 that may be made of a synthetic or natural material that are traditionally textured and dyed an orange color. Basketballs are typically constructed such that directly beneath the visible skin panels 160 is a carcass layer 140. Beneath the carcass layer 140 are other layers including a windings layer and a bladder layer that are described in reference to FIG. 6 below. As discussed below, the pocket can be anchored to the inside of, to the outside of, or between any of the layers, as appropriate. Also, a coil 120 may similarly be located on the outside of, on the inside of, or between adjacent pairs of any of the layers, as appropriate. Generally, the coil 120 may be located at a level in the stack of layers that is the same level as the opening of the pocket, though connections between the electronics and the coil 120 may be made in various manners.

While certain aspects of the instrumented basketball 100 are common to an ordinary basketball, one different feature is the pocket 150 of the instrumented basketball 100. The pocket 150 can be integrated into the construction of the ball shell 110. For example, as described further in U.S. Publication No. 2012/0058845 which is hereby incorporated by reference in its entirety, the pocket 150 can be initially formed by molding as a separate item. The pocket 150 can then be affixed to an inner bladder of the ball shell 110 (the inner bladder is described further below in reference to FIG. 6). For example, in some embodiments, the pocket 150 can be made integral with the inner bladder of the inflatable object during a molding process used to produce the inner bladder. In other embodiments, the pocket 150 can be adhered to the bladder using an adhesive welding process. In some cases, the material of the inner bladder and the material of all or a portion of the pocket 150 can be treated (e.g., vulcanized) to form an integral unit.

An electronics pack 120 can be housed within the pocket 150. The pocket 150 can be specifically configured to contain the electronics pack 120 (e.g., by having a molded opening sized and shaped to match the pack 120 so that the pack is held securely). The electronics pack 120 can be an assembly of one or more electronic components, such as a battery 122 and one or more circuit boards 124. The battery 122 can supply power to circuit board 124 and other electronic components housed within pocket 150. In some embodiments, the battery 122 can receive electrical power from the circuit board 124 to be recharged (in addition to supplying electrical power to the circuit board 124 in order to power components mounted on the circuit board 124). A secondary coil 130 can be electrically attached to the circuit board 124 in order to provide a source of electrical energy for powering a battery charging circuit included on the circuit board 124 as described further below. In other embodiments, the secondary coil 130 (which is "secondary" because it is arranged to receive electrical energy inductively from a separate primary coil described in more detail below) can be mounted directly to the battery 122 (e.g. to a chip package or circuit board that is packaged as part of the battery 122), which may be provided with electronics for managing its charging and discharging.

In addition to a battery charging circuit, the circuit board 124 can include various electronic components including sensors such as motion sensors (e.g., accelerometers, angular rate gyros, and magnetometers), temperature sensors, pressure sensors, and magnetometers. The sensors can be configured to, for example, record data relating to motion of the sports ball 100 to which pocket 150 containing the electronics pack 120 is attached or is a part of. For example, the sensors can measure angular velocity, acceleration, linear velocity, and/or deceleration. As another example, the sensors can identify the number of times that a basketball 100 is bounced or contacted within a set time period using such measured parameters. As yet another example, the sensors can measure an angle at which basketball 100 contacts a surface (e.g., the floor). As yet another example, the sensors can be used to identify a spin rate of a sports ball 100. As another example, the sensors can be used to identify the frequency and force with which a punching bag is punched or otherwise contacted. As still another example, the sensors can be used to identify the number of times a soccer ball is contacted over a set time period. The sensors can also, for example, be used to measure the spin rate of a spiraling football, the arc of a basketball shot, the spin axis and spin rate of a basketball shot, or the velocity with which a soccer ball is kicked. As still a further example, a magnetometer sensor can be configured to sense the presence of a metallic object external to the instrumented sports ball 100, such as when an instrumented basketball 100 is near or goes through the metal rim of the typical basketball goal.

The battery 122 can, for example, be a primary battery (e.g., non-rechargeable alkaline), or a rechargeable battery such as a nickel-metal hydride, lithium ion, lithium polymer, or zinc oxide battery. In some embodiments, the battery 122 can be directly installed onto the circuit board 124. In other embodiments, the battery 122 can be connected to the circuit board 124 via conductive wires. In some cases, the battery 122 can be pre-packaged together with the circuit board 124 to provide a unitary pack for insertion into the pocket 150. In other cases, the battery 122 and the circuit board 124 can be separate items that are connected together by electrical wires.

The electronics pack 120 can be placed in the pocket 150 so that the electronics pack 120 is below the rim around the periphery of the opening of the pocket 150, where the rim is coextensive with the outer periphery of the ball (though even a round ball will ultimately have minor variability because of seams, stitching, and the like). However, the secondary coil 130 can remain exterior to the pocket 150. Therefore, the electrical connection (e.g., wires or flexible printed circuit board) between the electronics pack 120 and the main portion of the secondary coil 130 can be routed from the electronics pack 120 located inside of the pocket 150 to the secondary coil 130 located outside of the pocket 150.

Figure 1B:
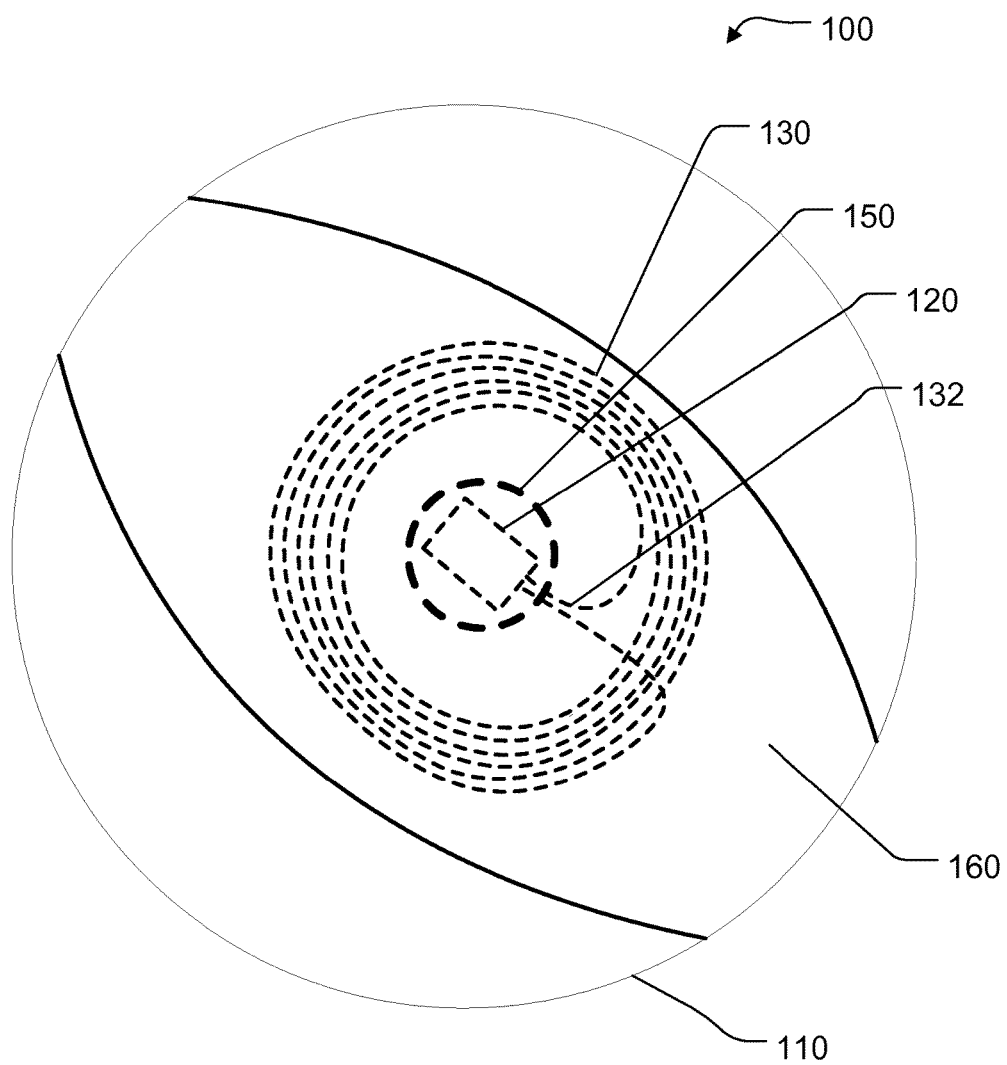
FIG. 1B shows an example instrumented sports ball with an example secondary coil and electronics pack installed within the sports ball.

In FIG. 1B, an embodiment illustrating an example final installation positioning of the secondary coil 130 within the basketball 100 is shown. In particular, a ball 100 may be enclosed with the secondary coil 130 inside of it, in a manner that the ball will bounce easily while maintaining pressurized air inside it—but the secondary coil 130 may still be accessible inductively.

The secondary coil 130 can be part of a system for inductively (wirelessly) charging the battery 122 within the sports ball 100. In this embodiment, the main portion of the secondary coil 130 is shown as approximately circular (from above, though thin and arced form the side). However, as will be described below in reference to FIGS. 7A-7D, the secondary coil 130 can also have a variety of configurations other than circular. The secondary coil 130 is depicted by hidden (dashed) lines because the installation position of the secondary coil 130 is positioned below at least the top skin panels 160—and may be between other lower layers of the ball. In this manner then, the secondary coil 130 is typically not visible on the outside of the ball, and the one or more top skin panels 160 that covers the coil can be made to appear no differently than the other top skin panels 160 that do not cover a secondary coil 130. In some embodiments, the secondary coil 130 may be installed in an area on a layer of the sports ball 100 that has a surface depression designed to approximately cradle the secondary coil 130. Such a surface depression may allow the secondary coil 130 to be embedded in the ball construction layer on which the secondary coil 130 is installed. Using this technique, the outer surface of the secondary coil 130 can be flush with or at approximately the same planar level as the ball construction layer in which the secondary coil 130 resides—thereby enabling an installation of the secondary coil 130 to enhance the playability of the instrumented sports ball 100, in that the ball will not bulge in any manner in a location where the secondary coil 130 is installed.

The dashed lines of secondary coil 130 represent the continuous electrical conductor that primarily makes up the secondary coil 130. The ends of the coiled conductor are electrically attached to the circuit board 124 of the electronics pack 120. Also, the secondary coil 130 may be connected to the circuit board 124, so as to feed field information to the electronics so that the electronics can adequately determine the field around the sports ball 100. In other words, and as discussed in more detail above and below, the secondary coil 130 can both receive electrical power and provide it for charging a battery in the ball, can sense electrical fields around the ball and report data about such fields (though such sensing may also or alternatively occur using a magnetometer that is separate from the coil 130), and can be used as a communication mechanism itself by receiving data from and providing data to, a charging dock or other item that might be in proximity to the ball (though such data may also occur or alternatively occur using other wireless communication mechanisms such as a Wi-Fi chipset attached to the circuit board 124).

The secondary coil 130 can be constructed in various manners. In one embodiment, the secondary coil 130 can be a type of commercially known inductance coil product similar to those, for example, manufactured by Vishay Intertechnology, Inc. of Malvern, Pa. In other embodiments, the secondary coil 130 can be made of a copper-clad flexible printed circuit board material that is manufactured to provide conductor paths arranged in a spiral configuration. The flexible printed circuit board material can also have multiple layers that can provide for multiple approximately concentric coils which can enable a higher rate of inductive energy transfer than a single layer of material.

In some embodiments, the secondary coil 130 and the circuit board 124 of the electronics pack 120 can be concurrently manufactured from one piece of flexible circuit board material. Such a configuration can eliminate the need to secondarily connect the conductor of the secondary coil 130 to the circuit board 124—and may provide a robust and reliable electrical connection between the secondary coil 130 and the circuit board 124. In some embodiments, the secondary coil 130 can be manufactured separately from the printed circuit board 124, and the two can be secondarily electrically connected—such as at the time of the installation of the electronics pack 120 into the pocket 150. The secondary connections between the coil 130 and the circuit board 124 can be made in a number of manners, including soldering, crimping, using terminal connections, male/female connectors with detents, and the like. Effective strain relief techniques can be provided in conjunction with the connections to enhance the reliability of the electrical connections between the secondary coil 130 and the circuit board 124.

The ends of the conductor of the secondary coil 130 travel from the coiled portion of the secondary coil 130 to the electronics pack 120 via an approximately linear tail portion 132 as shown. The tail portion 132 can act as a shock absorber to isolate the flexing caused by impacts at the surface of the ball shell 110 from being transferred from the secondary coil 130 to its connections with the circuit board 124. In this manner, the stress on, and transmitted by, the electrical connections can be reduced, and the reliability of the electronics can be enhanced.

Figure 1C:
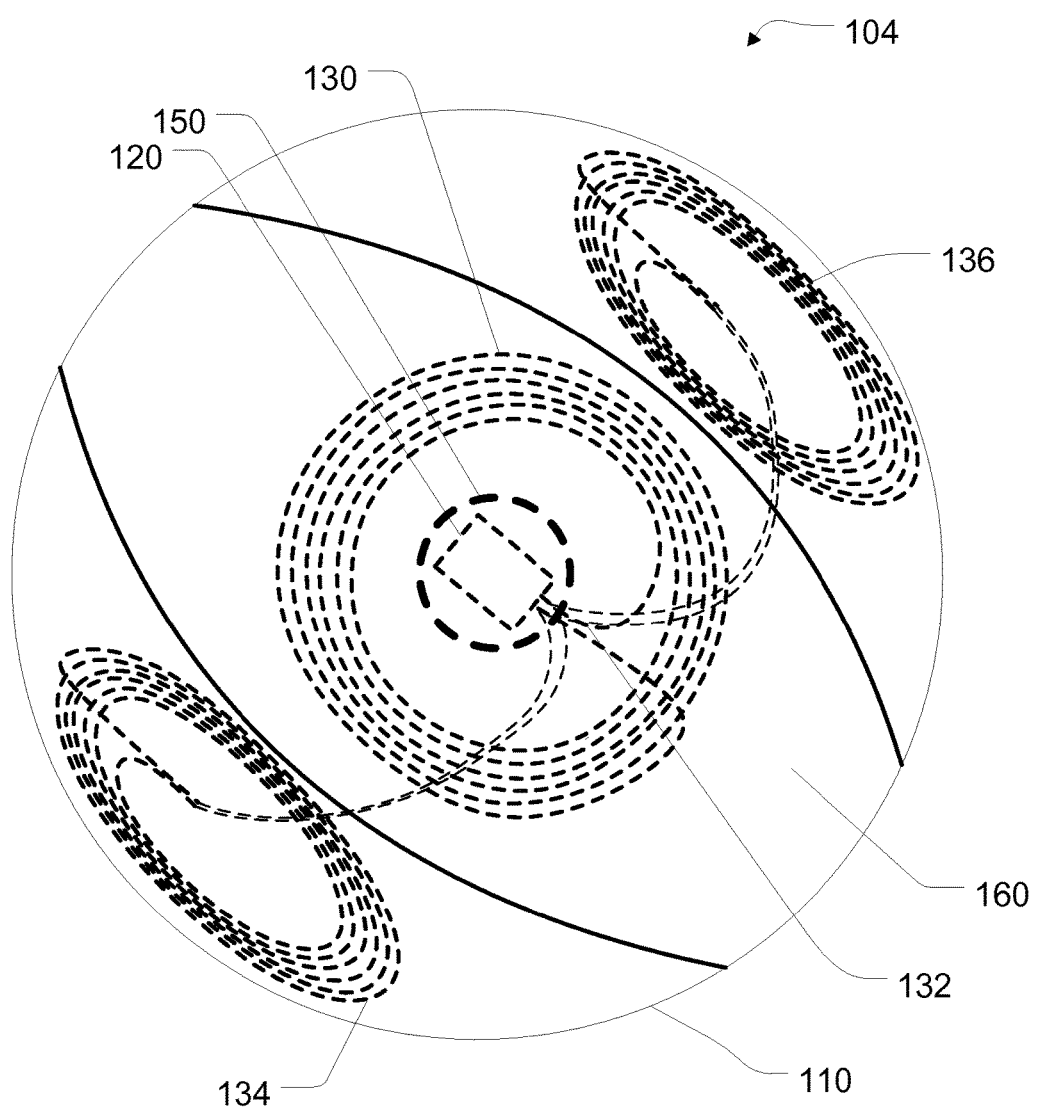
FIG. 1C shows an example instrumented sports ball with multiple secondary coils.

FIG. 1C depicts an example embodiment of an instrumented sports ball 104 with multiple secondary coils 130, 134, and 136. This ball can share the same basic structure and features as described above regarding sports ball 100, while having multiple secondary coils 130, 134, and 136. Though the instrumented sports ball 104 is depicted as having three secondary coils 130, 134, and 136, more than three coils may also be used. For example, each of the eight panels in the typical basketball can have at least one secondary coil. Further, in some embodiments, two or more secondary coils may be positioned in each of the eight panels.

The addition of more secondary coils can provide greater functionality and convenience regarding the inductive power transfer process. For example, with multiple secondary coils, the requirements for the accuracy of the positioning of the ball on the charging station to achieve the needed coupling alignment between the primary and secondary coils can be less stringent, or completely eliminated. With the addition of more secondary coils, more properly coupled orientations of the ball to the charging station can be achieved (i.e., at least one properly coupled orientation for each of the secondary coils). As more secondary coils are added, one or more of the secondary coils can be in coupling alignment with the primary coil in multiple orientations or any orientation of the ball to the charging station. In this manner, the orientation of the ball to the charging station can become irrelevant or nearly irrelevant to the inductive charging process.

Other features of the instrumented sports ball 104 with multiple secondary coils 130, 134, and 136 may be enhanced by the addition of multiple secondary coils. For example, the data transfer process may be enhanced in that the data may be transferrable over a greater distance or at a higher data transmission rate. Further, a sensitivity of the ball 104 to detect field disruptions near the ball 104 may be enhanced. This feature may enable improved properties for detecting when, for example, the basketball is near or goes through the rim of a basketball goal.

Figure 2:
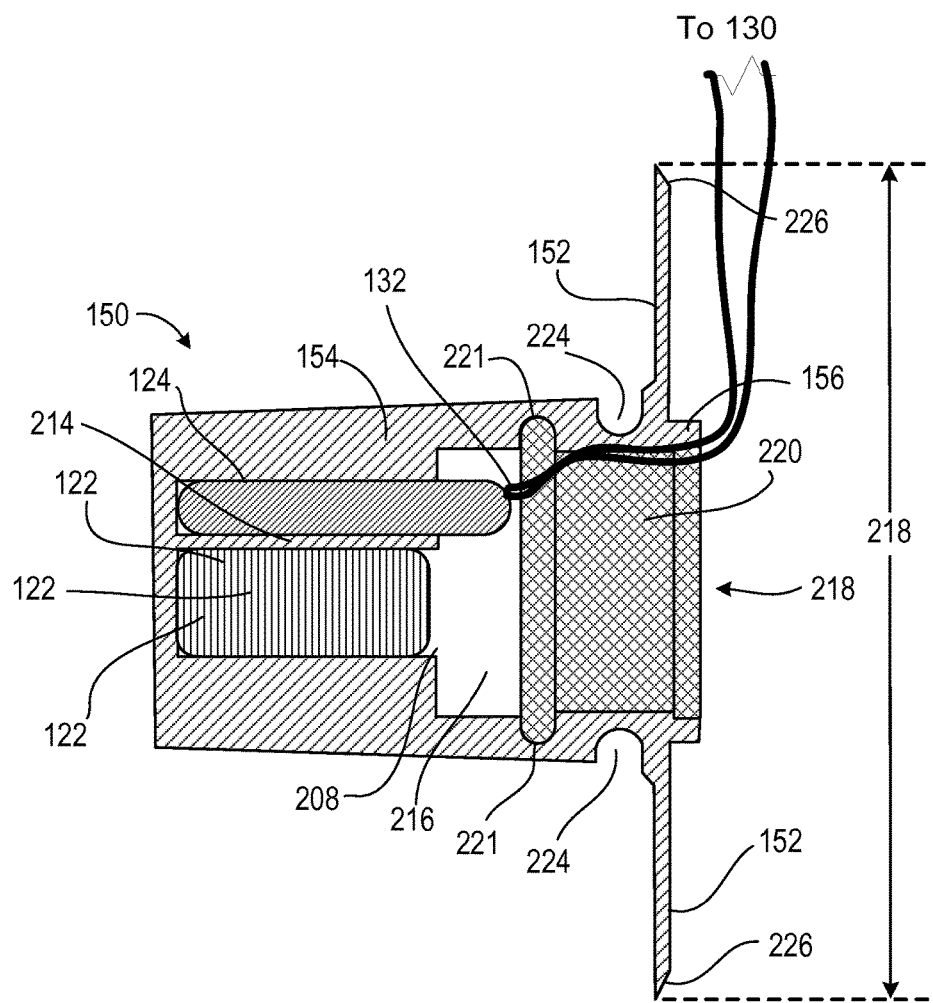
FIG. 2 shows an example of electronic instrumentation in a sports ball.

FIG. 2 depicts a cross-sectional view of pocket 150 with the electronics pack 120, including the battery 122 and circuit board 124, installed in the pocket 150. In some embodiments, the circuit board 124 can be in the form of a single discrete module, and can include sensors, a corresponding printed circuit board (PCB), memory, and the like as described further below in reference to FIG. 8. Also, the tail portion 132 of the secondary coils 130 may electrically connect the secondary coils 130 to the circuit board 124 as depicted. The electrical connection of the secondary coils to the circuit board 124 can be provided so as to supply charging power for the battery 122, to feed field information to the circuit board 124, and/or to enable wireless communications from the electronics on the instrumented sports ball 100 to an external network or computing device (using e.g., Bluetooth technology)—or any combination of one or more of these actions.

The instrumentation of an instrumented sports ball 100 can be located, for example, in a pocket 150 of the ball—as the battery 122 and circuit board 124 are depicted in FIG. 2. In some cases, the battery 122 and the circuit board 124 can be embodied as a unitary electronics pack.

The electrical connection between the circuit board 124 and the tail portion 132 of the secondary coils 130 can be accomplished in a variety of ways. For example, as described above, the ends of the tail portion 132 can be connected using male/female connectors, soldered, terminated, crimped, etc., to the circuit board 124.

In other embodiments, the electrical connection of the secondary coils 130 to the circuit board 124 can be made as follows. The conductors of the tail portion 132 can be exposed (stripped of outer insulation) and draped into the pocket 150 after the secondary coils are installed in the ball but prior to the insertion of the electronics pack 120 into the pocket 150. The electronics pack 120 can have corresponding exposed electrical pads provided on it that are in electrical communication with the circuit board 124. Just prior to the insertion of the electronics pack 120 into the pocket 150, the conductors of the tail portion 132 can be positioned adjacent to respective pads on the electronics pack 120. Then when the electronics pack 120 is inserted into the pocket 150, the inner wall of the pocket (and the natural tendency of the tail portions to spring back straight) can press and hold the conductors of the tail portion 132 in contact with the pads of the electronics pack 120 to make the electrical connections. In some cases, a retainer ring can be included that surrounds the electrical pack 120 to clamp the conductors of the tail portion 132 in contact with the pads of the electronics pack 120. That is, a retainer ring can be initially located around a bottom periphery of the electronics pack 120. After insertion of the electronics pack 120 into the pocket 150, and after the physical contact between the conductors of the tail portion 132 and the pads of the electronics pack 120 is established as described above, the ring (which will have slid past the tail portion 132 as the pack 120 was inserted) can be slid upwards to a position in which it surrounds the periphery of the electronics pack 120 in the area where the pads make contact with the conductors of the tail portion 132. The conductors of the tail portion 132 can also be contained within the retainer ring—in position against the outside of the electronics pack 120. In this manner, the retainer ring can provide additional clamping force to hold the conductors of the tail portion 132 in reliable contact with the pads of the electronics pack 120.

The pocket 150 can be used to retain or position the various electronic components. In some cases, the pocket 150 can be integral with an inner bladder of an inflatable object (e.g., sports ball 100), integral with the outer skin of an inflatable object, or can be configured to securely affix to an inflatable object. The pocket 150 can also be filled with a liquid, foam, or gel that hardens partially or fully after the electronics pack 120 is placed in the pocket 150.

The electronic components retained or secured in position by pocket 150 can include, for example, one or more motion sensors for recording motion data and detecting motions of an inflated object to which pocket 150 is a part. The motion data collected by the sensors can be used to evaluate various athletic skills and abilities, such as basketball handling skills, dribbling skills, and shooting skills, that can be used to assess the skill level of a player and help to improve that player's skills and abilities.

Pocket 150 can also include an extending lip portion 152 that can be attached to a main body portion 154. Extending lip portion 152 extends around main body portion 154 to form a circle (e.g., a complete circle). In some cases, extending lip portion 152 is molded or vulcanized during manufacture such that it becomes integral with a layer (e.g., an inner bladder layer, or an outer skin layer) of the inflatable sports object. In some implementations, extending lip portion 152 can extend further in some directions than others (e.g., to form an oval shape). Also, extending lip portion 152 and main body portion 154 can be constructed together from a single piece of material. In some implementations, extending lip portion 152 and main body portion 154 are constructed from separate pieces and affixed to one another. Extending lip portion 152 and main body portion 154 can, for example, be constructed from rubber, flexible or semi-flexible plastic, leather, or composite leather (e.g., synthetic leather).

Pocket 150 can be affixed to or be made integral with a basketball or other inflatable sports ball. For example, pocket 150 can be designed such that all or a portion of extending lip portion 152 becomes integral with the inner bladder of a sports ball. In some cases, the thickness of the inner bladder at the region that includes lip portion 152 can be thicker than the inner bladder at other regions. For example, extending lip portion 152, when integrated into the inner bladder, can increase the thickness of the material of the inner bladder in the region around the sensor enclosure. In some cases, the inner bladder material can form a flush interface with the top surface of the pocket 150 at, e.g., upper portions 156. When a sports ball is being manufactured, the upper portions 156 can be placed within an opening in an inner bladder. Once the upper portion 156 is inserted, extending lip portion 152 and upper portions 156 can be treated (e.g., vulcanized) such that the material of extending lip portion 152 and upper portions 156 become integral with the material of the inner bladder.

In some implementations, pocket 150 can affix to or be made integral with an inflatable object with (or without) the upper portion 156 of pocket 150 extending above a surface of the inflated sports object and/or extending lip portion 152, which can form a portion of the outer surface of the inflatable object.

In some cases, upper portion 156 of pocket 150 and/or the upper surface of cap 220 can be textured to match the texture of the outer surface layer of the inflatable sports object when upper portion 156 of pocket 150 and/or the upper surface of a cap 220 of pocket 150 are configured to be exposed to an outer surface. In some cases, a separate layer of textured material can be placed or affixed to upper portion 156 and/or the upper surface of cap 220 such that the separate layer of textured material matches the texture of the outer surface layer of the inflatable sports object. Such a separate layer can be designed to have an opening that can be aligned with the opening of cap 220. In some embodiments, cap 220 is a thin material that is selected to closely match the properties of the inflated ball to improve bounce performance in the area of the pocket 150. The material can be lightweight plastic or metal, and can be concealed below the surface skin of the ball.

In some embodiments, cap 220 may include one or more holes in the shell material so as to expose status indicator lights such as in the form of LED lights. Such lights can be activated so as to indicate that the ball is turned on, is working properly, has had an error, or other such status indication. Also the lights may be made to blink by the circuit board 124, such as to indicate a problem with the electronics. Various numbers and colors of lights may be used, and the signals provided to light the lights may vary based on the implementation. Also, the lights can be recessed several millimeters into the ball, and the remainder of the holes may be filled with transparent, compliant materials, such as silicone, that will not impede the handling and play.

In some embodiments, pocket 150 can include a divider 214 for separating battery 122 from circuit board 124, and for more securely holding battery 122 and circuit board 124 in place. Divider 214 can be made from, for example, rubber, plastic, foam, or another suitable material. In some implementations, the material selected for divider 214 can be suitably shock absorbent so as to retain battery 122 and circuit board 124 in place while absorbing at least part of the force of an impact when an inflated object to which pocket 150 is attached contacts a surface or other object.

In other embodiments, pocket 150 does not include divider 214. Rather, the cavity defined by the pocket 150 can be a substantially open space for the electronics pack 120 to reside in. In some embodiments, the electrical pack 120 can be securely supported within the pocket 150. In particular embodiments, the electrical pack 120 can be surrounded with vibration dampening material such as foam. The pocket 150 can also be designed to absorb shock and to transfer heat away from the electronics pack 120, so as to enhance the reliability and performance of the electronics in the instrumented sports ball 100. In some embodiments, the pocket is attached to a foam ring, and the foam ring is attached to the bladder of the ball. That construction can provide enhanced vibration and impact energy absorption to protect the electrical pack 120.

In some embodiments, the electronics pack 120 can be securely held in the pocket 150 as a result of the air pressure in the ball shell 100 which can collapse flexible walls of the pocket 150 to compress the electronics pack 120 within the pocket 150 (e.g., as described in U.S. Publication No. 2012/0058845). In other embodiments the electronics pack 120 can be held securely in the pocket 150 by installing a cap 220 in the opening defined by the pocket 150. The cap 220 can be configured so that the installed cap 220 transmits an appropriate pressure on the electronics pack 120 to contain the electronics securely within the pocket 150. For example, a cap 220 can be configured to provide a flush or nearly flush surface with the uppermost layer of the pocket 150 and to assist in ensuring that the components stored within pocket 150 remain secured in place. The cap 220 can be manufactured, for example, from rubber, plastic, foam, leather, or composite leather. The cap 220 can have a suitably compliant lower portion (not shown) that interfaces with the electronics pack 120 to compress the electronics pack 120 securely within the pocket 150. The cap 220 can be held in place in the pocket 150 using a compression fit, a snap fit (as indicated by rim 221), by adhesive, using barbs, or the like.

In another embodiment, rather than using a cap 220, the electronics pack 120 can be secured in the pocket 150 by adding another material to fill the open portions within the pocket 150 surrounding the electronics pack 120. For example, a curable liquid material such as silicone or rubber can be poured or injected into the pocket 150 to fill the voids around the electronics pack 150 using a potting process. After curing, the material can solidify to hold the electronics pack 150 securely in position and to absorb shock. In addition, the material can be selected to provide playability characteristics (e.g., weight, bounce, balance) that are approximately consistent with the host sports ball in general. In another embodiment, a foam material can be injected to fill the voids surrounding the electronics pack 120 within the pocket 150. In some embodiments, expandable foam can be used for the potting process, and any excess foam that protrudes from the pocket 150 can be trimmed off after the foam has cured.

Figure 3:
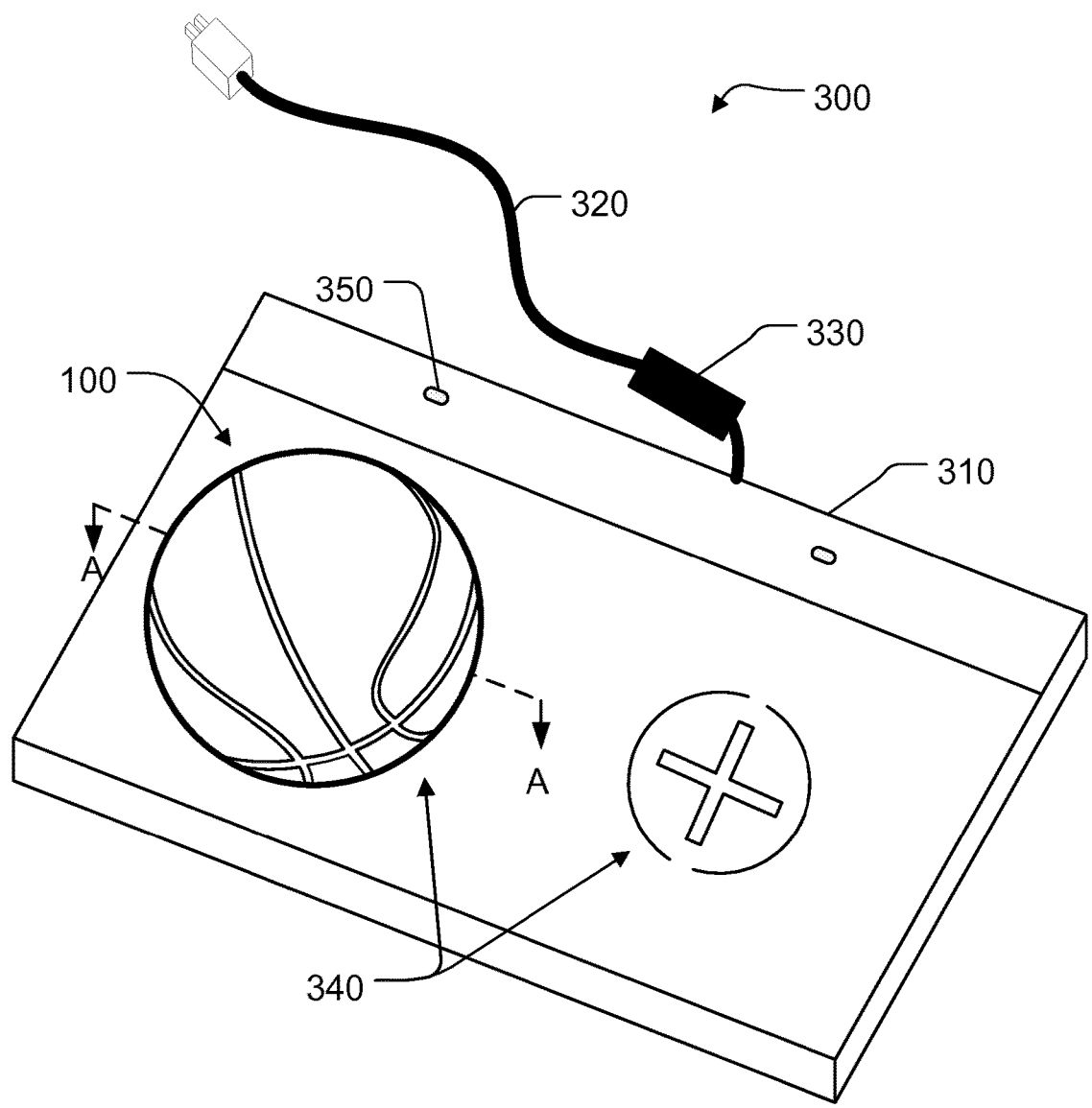
FIG. 3 shows perspective view of an instrumented sports ball on an example charging station for inductively charging the internal battery of the instrumented sports ball.

FIG. 3 illustrates an example inductive charging system 300 for charging the internal battery of an instrumented sports ball 100. The dock 310 in this example is a portable inductive power source for use in powering or charging electrical, electronic, battery-operated, mobile, rechargeable batteries, and other devices, such as instrumented sports ball 100.

In general, an embodiment the charging system 300 comprises two primary parts. The first part is the pad or charging dock 310. The charging dock can contain one or more primary coils 340. The primary coils 340 are typically positioned below the surface of the charging dock, from where they emit an alternating magnetic field when an alternating current is applied to the primary coils 340. In some embodiments, the charging dock 310 can also contain various signaling, and switching or communication circuitry, or means of identifying the presence of devices or batteries to be charged or powered. In some embodiments, the charging dock 310 is compliant with the Qi standard for inductive charging (e.g., the ENERGIZER Inductive Charger). In some embodiments, the charging dock 310 can also contain multiple coils 340 or sections to charge or power various devices or to allow charging or powering of devices or batteries placed anywhere on the surface of the charging dock 310.

The second primary part of the charging system 300 is one or more secondary coils that can receive the energy of the alternating magnetic field emanating from primary coils 340 of the charging dock 310. The secondary coils are located within the object to be charged, e.g., instrumented sports ball 100 containing secondary coils 130. The secondary coils transfer the energy to charge a battery, or other device, via an electrical circuit electrically attached to the secondary coil, e.g., the electrical circuit on circuit board 124 that is wired to secondary coils 130. The electrical circuit can rectify the alternating current transmitted to the electrical circuit from the secondary coil to produce a direct current voltage, which is then used to charge or power the sports ball 100 and battery 122.

In this example, the inductive charging dock 310 has two docking positions so that it can charge and communicate with at least two sports balls 100 at the same time. Other configurations with greater or lesser numbers of open positions are also possible. In another embodiment, the charging dock 310 systems can be integrated into a ball storage rack configuration.

The charging dock 310 in this example has a power cord 320 of a normal type that can be plugged into a wall outlet, and a processing block 330 (that may be alternately located internal to the charging dock 310) that may include, for example, a step-down transformer and associated charging circuitry, along with communications circuitry for causing the dock to communicate wirelessly with the sports balls 100. In some embodiments, such charging systems can be integrated into a rack configured for holding or storing the sports balls 100. In some embodiments, the charging system 300 may utilize the Qi standard created by the Wireless Power Consortium for wireless inductive charging.

One or more primary coils 340 in the charging dock 310 may transmit electrical energy by inductively coupling with one or more secondary coils, such as the secondary coils 130 installed between the construction layers of the instrumented sports ball 100. The dock 310 may provide indicators that the primary and secondary coils 340/130 are sufficiently coupled, such as by energizing an indicator light 350 or by emitting audible tones. In addition, in some embodiments, the coils or other components of the instrumented sports ball 100 may be used to wirelessly transmit data to and from the electronics of the sports ball 100.

Figure 4:
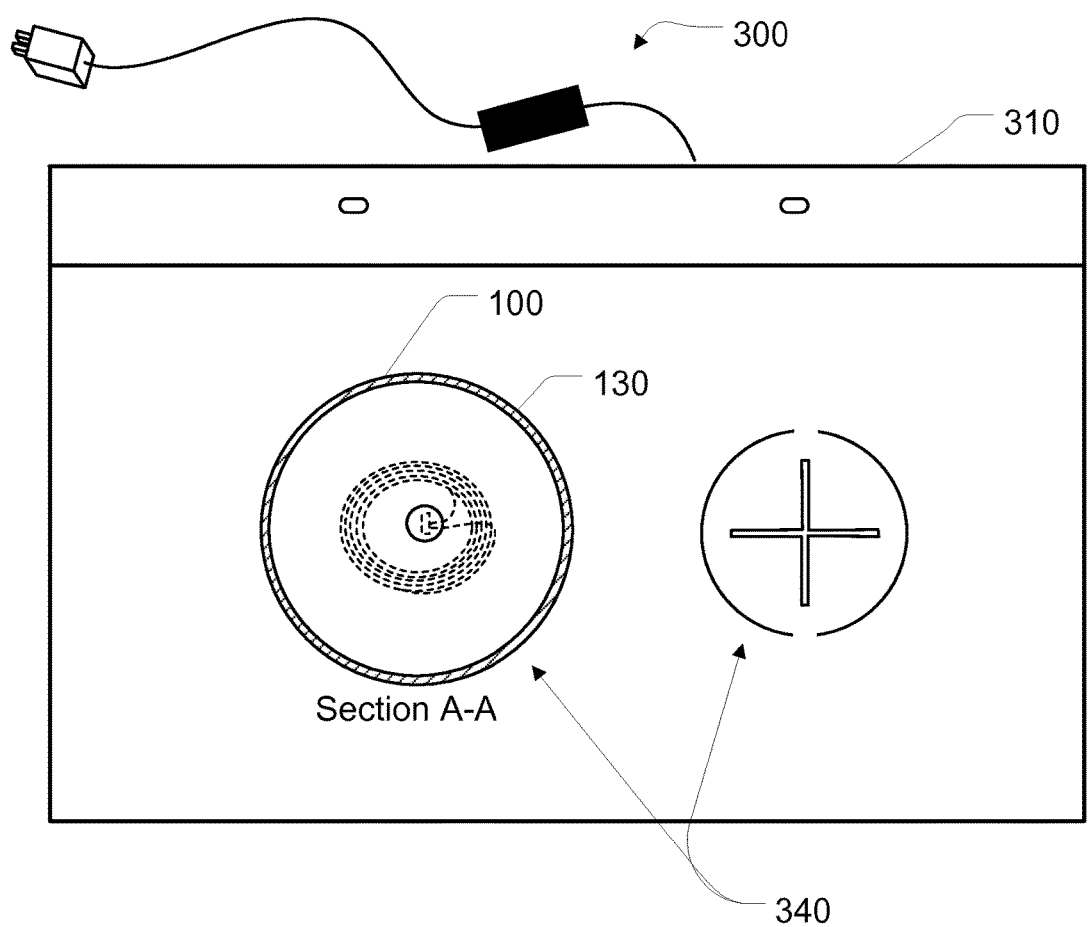
FIG. 4 shows a top view of a cross-section of an example instrumented sports ball on an example charging station for inductively charging the internal battery of the instrumented sports ball.

In FIG. 4, section A-A of the basketball 100 illustrates the approximate proper positioning of the secondary coil 130 in relation to the primary coils 340. Proper alignment and close proximity of the coils 340/130 are key factors for maximizing the inductive transmission of electrical power from the charging dock 310 to the sports ball 100. In some embodiments, the charging dock 310 may include labels or indentations to assist with the proper alignment. In some cases the charging system 300 may be augmented with supplemental cradles for holding the sports ball 100 in position on the charging dock 310. In addition, the sports ball 100 may include exterior labeling to identify to the user the proper positioning of the sports ball 100 in relation to the charging dock 310.

In some embodiments, multiple secondary coils 130 may be included in the sports ball 100. The multiple secondary coils 130 can be positioned within the sports ball 100 to provide for sufficient charging of the battery 122 and for enhanced convenience for a user. For example, the secondary coils 130 may be spaced at multiple locations around the periphery of the sports ball 100 so that any given secondary coil 130 will be within range of the primary coil 340 when the ball 100 is laid on the charging dock 310.

Figure 5A:
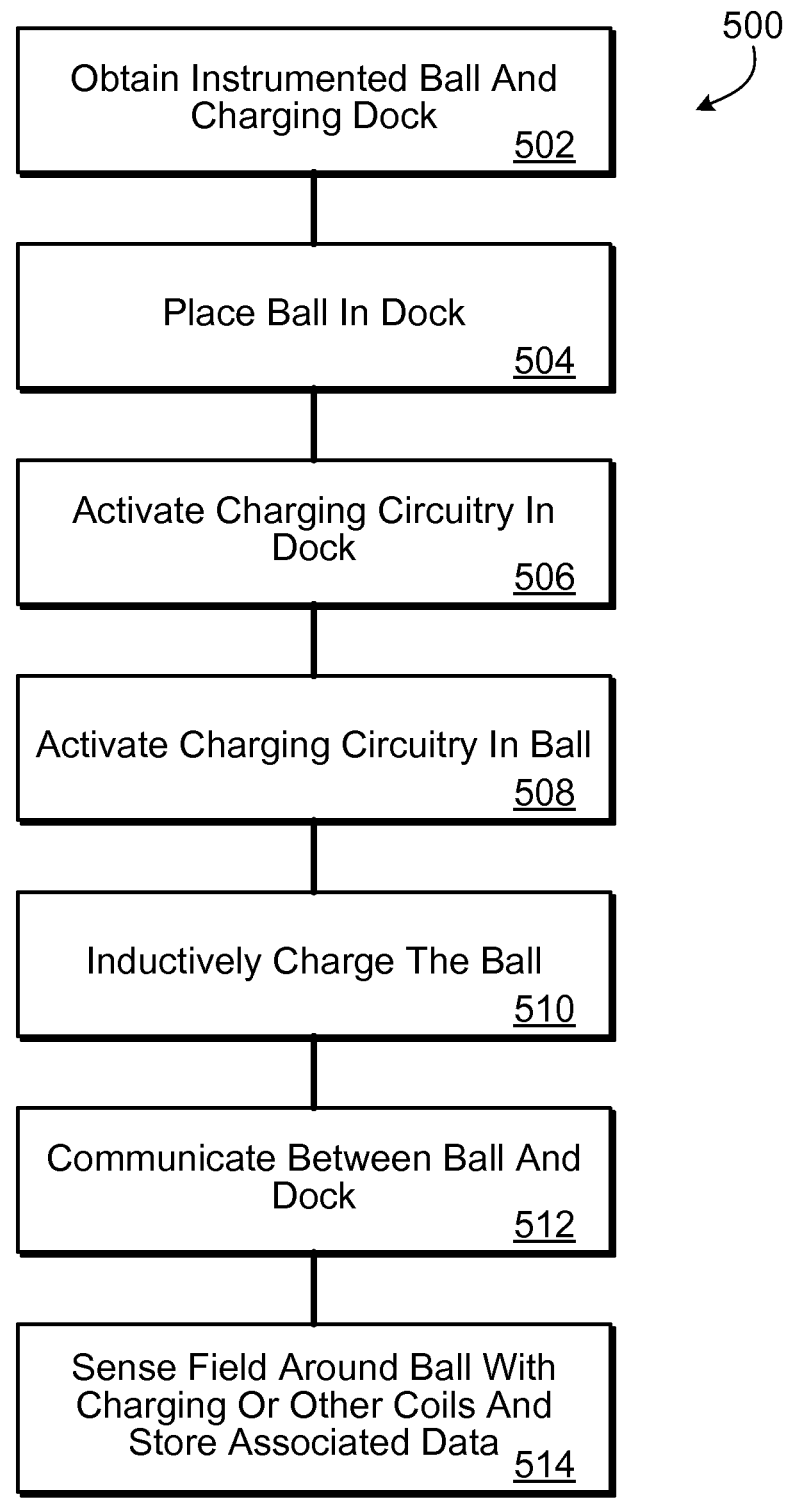
FIG. 5A is a flow chart of an example process for charging an instrumented sports ball.

FIG. 5A is a flow chart of an example process 500 for charging an instrumented athletics ball. In general, the process shows how a ball having internal electronic components may have a battery that powers those components charged, without having to remove the battery from the inside of the ball.

The process begins at box 502, where an instrumented ball and a charging dock are obtained. The ball may have inside of it several sensors and electronics and a power source for operating the sensors and perhaps a wireless communication interface that is capable of communicating from an inside of the ball to the outside of the ball. The dock may include an inductive charging system for providing charge to the ball that is matched to a system for receiving charge in the ball and charging an energy source, such as a battery, in the ball.

At box 504, the ball is placed on the dock. Such an action may trigger a mechanical or electronic switch in the dock to cause it to begin providing electrical power to a primary coil in an inductive charging system. That may in turn activate charging circuitry in the ball to cause energy applied to secondary coils in the ball to charge the energy storage source (e.g., battery or batteries), as indicated at boxes 506 and 508. The receptors that receive the electrical power via an electric or magnetic field generated by the dock may take a variety of forms, and may include one or more coils in or on a shell or bladder of the ball. When a small number of coils is used, it might be necessary to orient the ball on the dock so that the coils are near the surface of the dock—e.g., the coils may be at the bottom of the ball, and printed indicia may be provided on the ball instructing a user to place the ball in the dock right-side up. As a result of such positioning and powering, then, the battery in the ball may be charged in a familiar manner via inductive charging (box 510).

In addition to charging the ball from the dock, information may be communicated from the ball to the dock (box 512), including diagnostic information that describes the operation of and condition of electronics in the ball, and also of user data (e.g., motion data and magnetic field data) captured by the electronics while a player was bouncing and otherwise using the ball. For example, the ball may be provided with memory to capture and store such data, and may hold the data until triggered to transfer the data to memory in the dock or via a network connected to the dock, in response to a data request from the dock, which may be generated automatically whenever the dock senses a ball. Such batch delivery of data to the dock (as opposed to streamed delivery while the ball is being used) may be particularly useful when a user plays outdoors or otherwise away from an available wireless access point, or during practices then multiple balls would be streaming simultaneously and could potentially interfere with each other. In the latter situation, the players at the end of practice could simply places all the balls in a standard ball rack, and that rack could be equipped with inductive charging and communications electronics to charge the balls and read data from the balls.

At box 514, additional functionality of the ball is shown. In particular, the same coils that are used as secondary coils for inductive power transfer when the ball is docked on the charging station can also be used to generate a small field around the ball and to sense the strength of that field. Such operations may be used to determine when the ball passes through the middle of a basketball hoop (made shot) or passes by an outside edge of the hoop (missed shot). Sharp changes in the field thus represent presence of a ferrometallic object near the ball, and the relative changes sensed by multiple different sensors around the ball may be used to determine where, relative to the ball, the object was, and thus whether a goal was made or missed.

The operations of box 514 can also be implemented in another manner. In this implementation, the coils located in the ball sense the earth's magnetic field. That is, the coils are configured to sense the far-field electromagnetic field emanating from the earth. In addition, the coils of the ball are able to sense disturbances to the far-field signals, and those disturbances can be correlated to information about objects in close proximity to the ball. For example, when the ball is close to a ferromagnetic (e.g., steel) basketball rim, the coils of the ball will sense a disturbance in the magnetic field signal. The near-field signature of the ball being close to the basketball rim, but not passing through the rim will be detectably different from the near-field signature of the ball passing through the rim. Thus, the magnetic field signals received by the coils can be correlated to whether a goal was made or missed. Furthermore, when the ball is spinning with known rotation rate (as measured by the angular rate sensors) the ball is able to sample the 3D magnetic field and track proximity of the ball to objects by observing and measuring the changes in the magnetic field over time transformed through the known angular velocity vector.

Figure 5B:
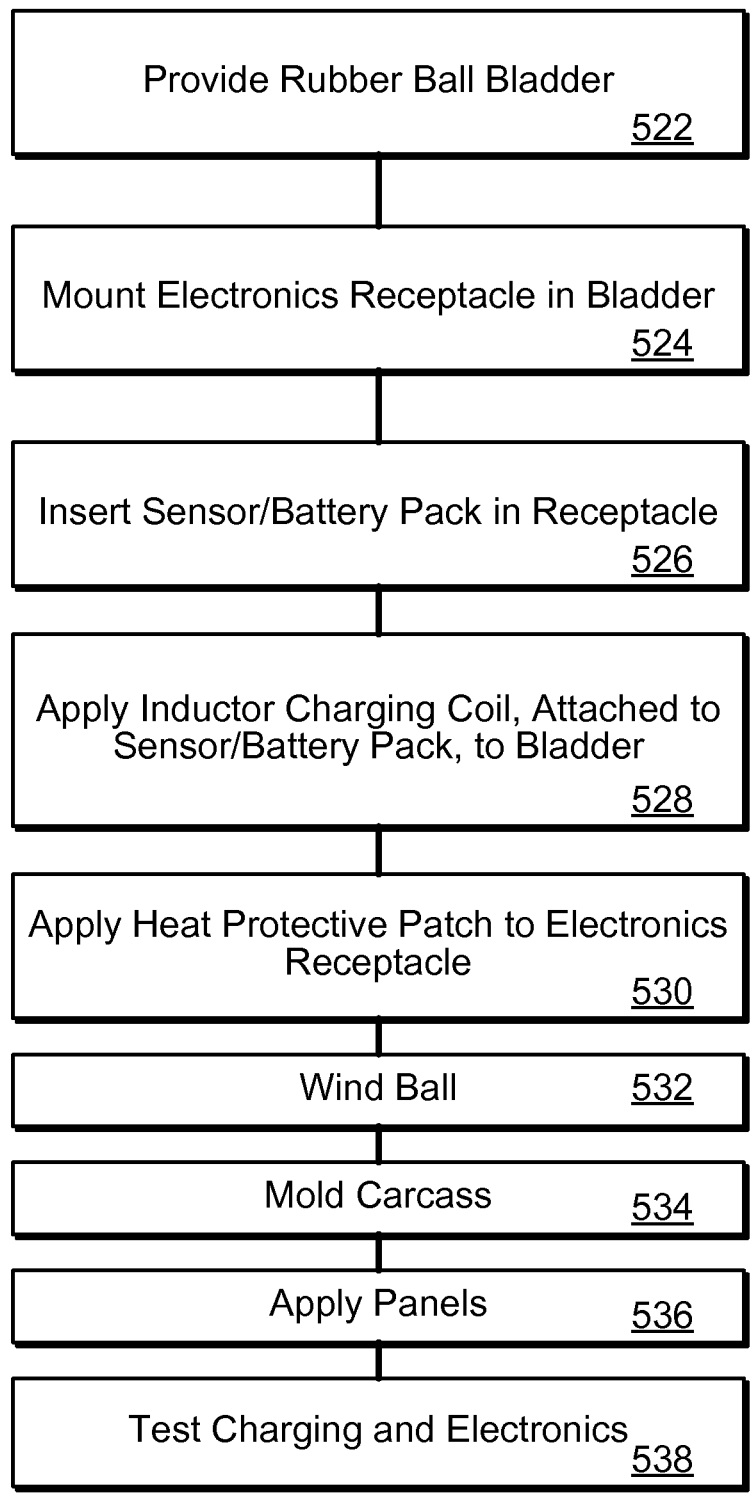
FIG. 5B is a flow chart of an example process for assembling an instrumented sporting ball.

FIG. 5B is a flow chart of an example process for assembling an instrumented sporting ball. The ball in this example may be a basketball of standard size and physical performance (e.g., such that it would be approved for use in organized play by relevant regulatory bodies such as the NCAA and NBA). In general, the process involves applying a receptacle for electronics in a bladder of the ball and completing steps of winding the ball and placing panels on the ball as necessary (where ball construction may differ based on the type of ball being built, e.g., soccer, basketball, football, etc.). The process is described here as a one-step process in which an electronics package (which includes sensors, associated supporting electronics, and a battery for powering the electronics and for being inductively charged) is placed in the ball early in the process. As such description is occurring, an alternative two-step process will also be described, wherein the electronics are not inserted into the ball until near the end of the process because of concerns about heat and/or other parts of the ball-making process being harmful to the electronics package and particularly to the battery chemistry.

The process begins at box 522, where a rubber ball bladder is provided. The bladder may be manufactured by conventional techniques and may be sized appropriately so that a properly-sized ball is produced when the bladder is covered with other necessary layers for the ball. The bladder may be generally airtight, but may be formed to have a hole in it for receiving an electronics receptacle. For example, a mold for the bladder may be provided with a blank that produces the hole when the bladder is initially formed, or a hole may be cut mechanically into a previously-produced bladder.

At box 524, an electronics receptacle is mounted in the bladder. In one example, the receptacle may take the form of a hollow, cylindrical boot having a closed end and an open and, and having a skirt extending outward from the periphery of the open end, so that the cylindrical portion can be passed through the hole in the bladder and extend toward the center of the bladder (and in the future toward the center of the completed ball), and the skirt may interface with the edge of the hole in the bladder, such as by having the skirt adhered (e.g., via chemical adhesive, sonic welding, or other process that weld the skirt portion of the boot to the bladder in an airtight manner. Thus, upon joining the boot to the bladder in this example, the bladder will be complete and generally airtight (except perhaps for a hole for a filling needle), and have an apparent hole in it that leads into the interior of the hollow cylinder of the boot. (The hole is only apparent because the sides and bottom of the cylinder are airtight.)

At box 526, a sensor/battery pack is inserted into the receptacle. In particular, an electronics assembly may include sensors (e.g., force, acceleration, and/or magnetometer), associated circuitry for interpreting, storing, and wirelessly transmitting information captured by the sensors, and one or more battery cells that power such sensors and other electronics.

At box 528, the inductive charging coil is applied to the bladder, with the coil attached to the electronics. For example, the coil may be formed as a flat copper or similar metal ring and may be placed on an outside surface of the bladder and centered with the hole for the receptacle on the inside of the ring, and a tab extending from the ring toward the receptacle so that the tab can be electrically connected to the electronics (or already has been before the application of the ring to the bladder). The coil can be adhered to the bladder, for example, via a flexible adhesive or in other appropriate manner.

When the ball is finally assembled, the electronics and battery cells will be connected to an inductive charging coil and be located inside an outer periphery of the ball. However, the order in which the different components are connected to each other can vary in different embodiments. For example, the electronics may be attached to the battery cells before or after the electronics are attached to the inductive charging coil, and before or after the electronics are attached to the ball. Similarly, the electronics may be placed in the receptacle before or after the receptacle is placed in the ball. As one example, the electronics could have rubber or other liquid material poured around the electronics so as to make a receptacle that becomes unitary with the electronics and provides good mechanical shock absorbance to the electronics and potentially greater insulation around the electronics (to be discussed below with respect to vulcanization and other high-temperature steps of the process. The assembly of the electronics in the receptacle/plug may then be inserted into the bladder. In some examples, the electronics may be mounted between two layers of the bladder, either as the bladder is formed or after formation of the bladder.

Also, the electronics may be introduced before or after high-temperature steps occur, such as vulcanization of the rubber. Where the electronics are introduced after, the inductive charging coil may have its tab attached to the electronics as the electronics are provided in the ball, such as by pushing the electronics into the receptacle as the tab extends into the cylinder and contacts the electronics (at an electrical conductor provide on the side of the electronics package) as the end of the tab is bent downward by the passing of the electronics into the hole. The inherent effort of the tab to return to a straight shape will then hold the tab in contact with the electrical conductor on the electronics.

Where the electronics are introduced before other high-temperature operations, a heat protective patch may be placed over the open end of the receptacle (box 530) and may include heat insulative material to prevent excessive heat (e.g., 60 degrees C.) from reaching and damaging the battery and other electronics. For example, such material may be in the form of a plug placed in the receptacle, and having an adhesive disk at its outside end so as to hold the material in places in the receptacle. Also, cooling air may be circulated through the bladder during high-temperature operations, the receptacle may be held in a heat sink (e.g., immersed in a cool liquid) during the high-temperature operations and other such actions may be taken to prevent damage to the electronics.

In this example, the ball is then wound (box 532), in a conventional manner, after the inductive charging coil is applied to the bladder. The carcass of the ball is them molded in a conventional manner (box 534) so as to create the last layer of the ball before applying the final panels on the ball. These steps may, in certain implementations, involve relatively high temperatures, so that the precautions just discussed (e.g., not inserting the batteries and/or other electronics until after the high-heat activities, or providing insulation or heating offsets to the components) can be taken to protect relatively sensitive components in the ball.

At box 536, the panels are applied to the ball (where the ball is of a type, such as a basketball, that has panels), and various finishing steps may be performed.

Finally, before or after packing for shipment, tests may be performed on the electronics, including tests of the chargeability of the ball and the operation of the sensors. For example, the ball may be placed in a fixture that moves the ball in a predetermined manner, and wireless sensors readings may be provided from the ball to an external computer that may identify whether those readings match expected readings for the applied motion. Also, an inductive electrical field may be generated in proximity to the inductive charging coil, and a reading may then be taken from the electronics to confirm that charge was added to the battery in the ball. With such testing completed, the ball may be passed for packaging and/or distribution. If the tests fail, they can be repeated one or more times according to a predetermined protocol, and if failures continue, the ball may be opened up and corrected or may be sold as a "second" (where the wireless instrumented operation is not guaranteed to work properly) or even as an un-instrumented ball.

Figure 6:
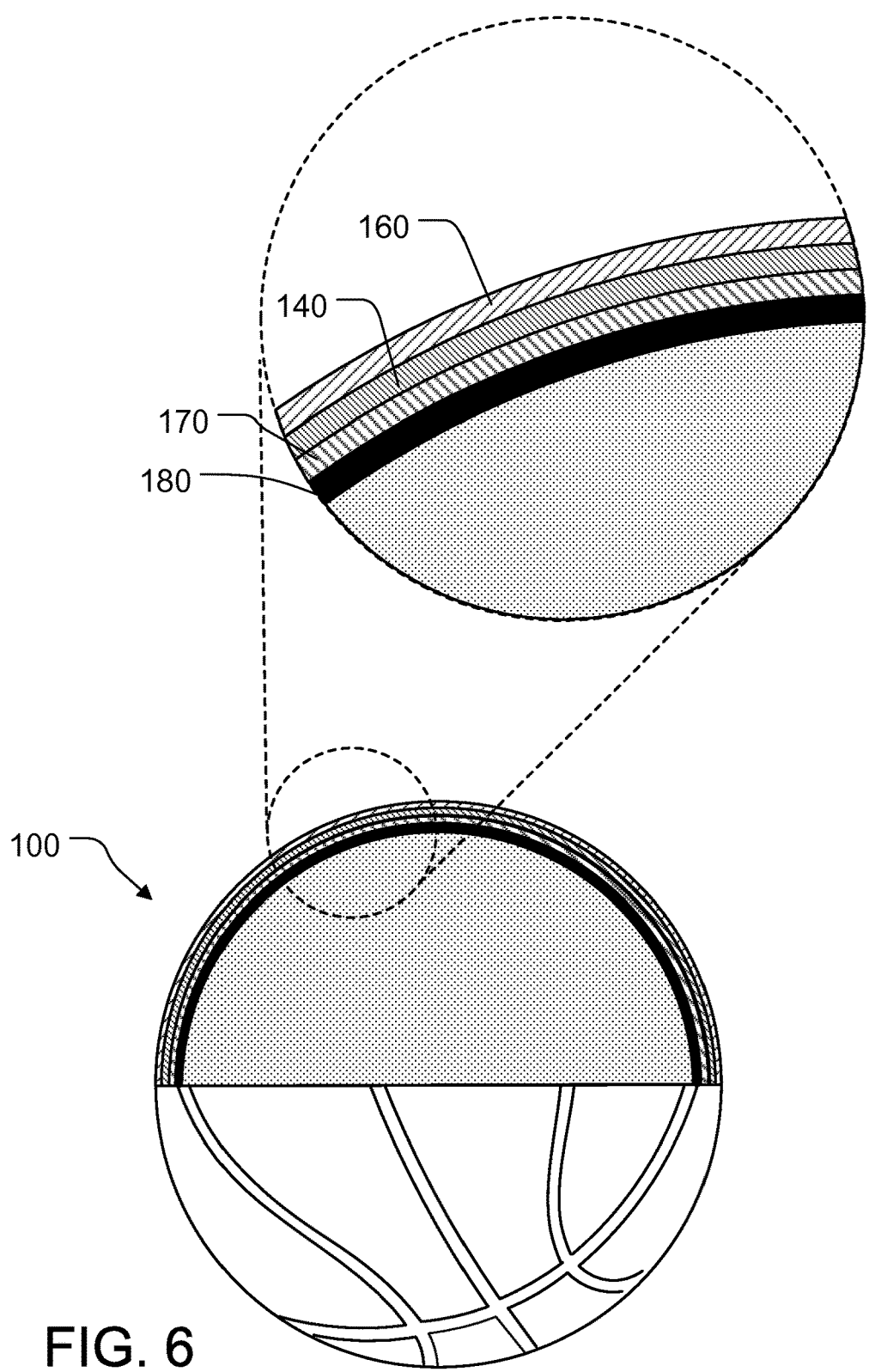
FIG. 6 shows the layers of construction an example basketball.

FIG. 6 illustrates, in cross-sectional view, the layered construction of a typical basketball. However, other constructions of basketballs and other types of inflatable and non-inflatable sporting devices having a variety of constructions are also within the scope of this disclosure. It should be understood that the one or more secondary coils 130 of an instrumented sports ball 100 can be positioned between any of the layers described here, and between other layers of other constructions of instrumented sporting devices. In implementations using more than one secondary coil 130, the secondary coils 130 can be positioned between the same layers or between different layers.

The skin panels 160 make up the outermost layer. Beneath the skins panels 160 is a carcass layer 140. In some embodiments, a secondary coil 130 can be disposed between the skin panels 160 and carcass layer 140. Directly beneath the carcass layer 140 is the windings layer 170. In some embodiments, the secondary coil 130 can be disposed between the carcass layer 140 and the windings layer 170. Directly beneath the windings layer 170 is the bladder 180. In some embodiments, the secondary coil 130 can be disposed between the windings layer 170 and the bladder 180.

FIGS. 7A-7D depict various embodiments of secondary coils for inductively charging an internal battery of instrumented sports ball 100. One or more such secondary coils may be installed within an instrumented sports ball 100. The secondary coils can also function to wirelessly transfer data from the electronics of the instrumented sports ball 100, and to sense ferro-magnetic objects in the field around the instrumented sports ball 100. In practice, as described above, the secondary coils are located beneath at least the outermost skin panels 160 of the basketball 100. However, here they are shown schematically on the surface of the basketball 100 to aid in visualization of the secondary coils. In general, the surface area of the secondary coils substantially determine the practical capacity or rate of passage of inductive energy between the primary and secondary coils. The embodiments shown include approximately the same total surface area, but are disposed in different shapes to illustrate some of the various possible configurations of the secondary coil. The configurations of the secondary coil can be selected, for example, in relation to the geometry of a particular sports object being instrumented, and based on the energy transfer efficiency realized by the configuration. The conductors of the secondary coils are typically copper or aluminum, although other conductive materials may be used. In some embodiments, multiple layers of coils may be used. In other embodiments, a single layer coil may be used. The embodiments shown are non-limiting examples of secondary coil shapes.

Figure 7A:
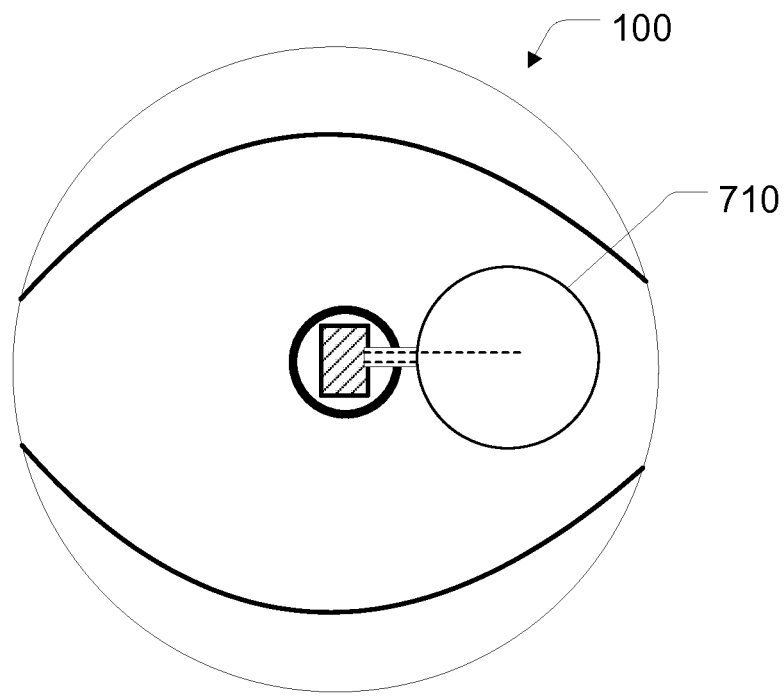
FIGS. 7A-7D depict example embodiments of secondary coils for installation in an example instrumented sports ball.

FIG. 7A depicts, as a first embodiment, a solid circular secondary coil 710. It should be understood that, in practice, the conductor making up coil 710 can be routed in a spiral configuration within the bounds of the circle shown. For simplicity of illustration, the individual conductor is not shown here. The overall footprint of the solid circular secondary coil 710 is minimized as a result of the compact coil configuration. Such a configuration may be particularly useful for smaller sports objects (e.g. footballs or soccer balls). The solid circular secondary coil 710 embodiment may result in a high efficiency and rate of the inductive energy transfer.

Figure 7B:
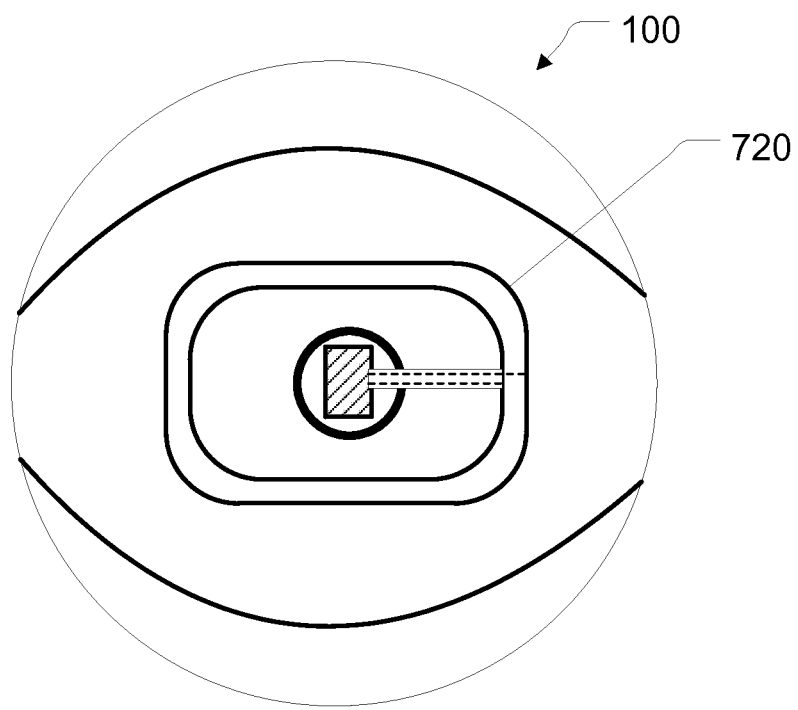

In FIG. 7B, an ovular or race-track-shaped secondary coil 720 embodiment is depicted. From a physical standpoint, the relatively long and narrow configuration may enable it to be particularly well suited to certain types of large or extended sports balls (e.g. a punching bag, football, or basketball). The relatively large outer size of this configuration reduces the number of turns of the conductor, which decreases the inductance properties of the coil. Hence, efficient inductive charging can result.

Figure 7C:
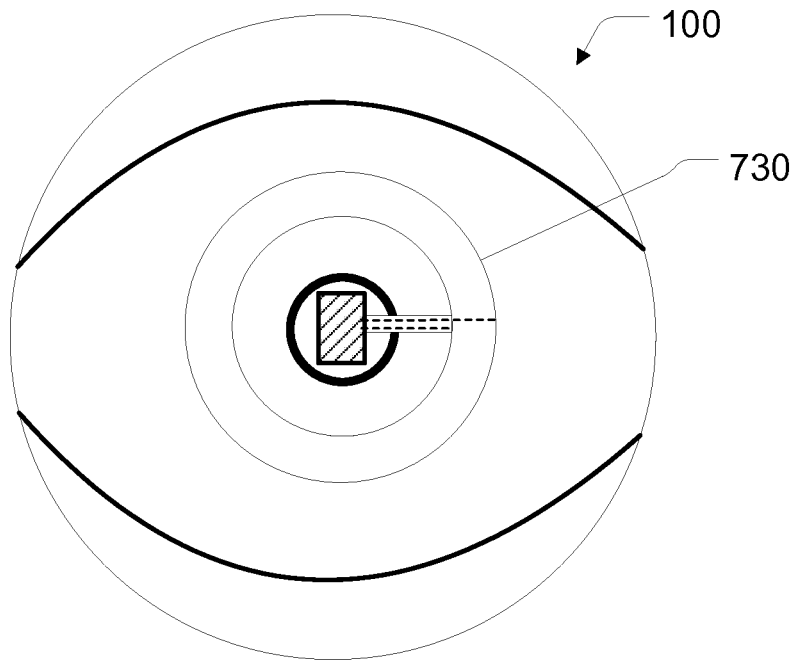
Figure 7D:
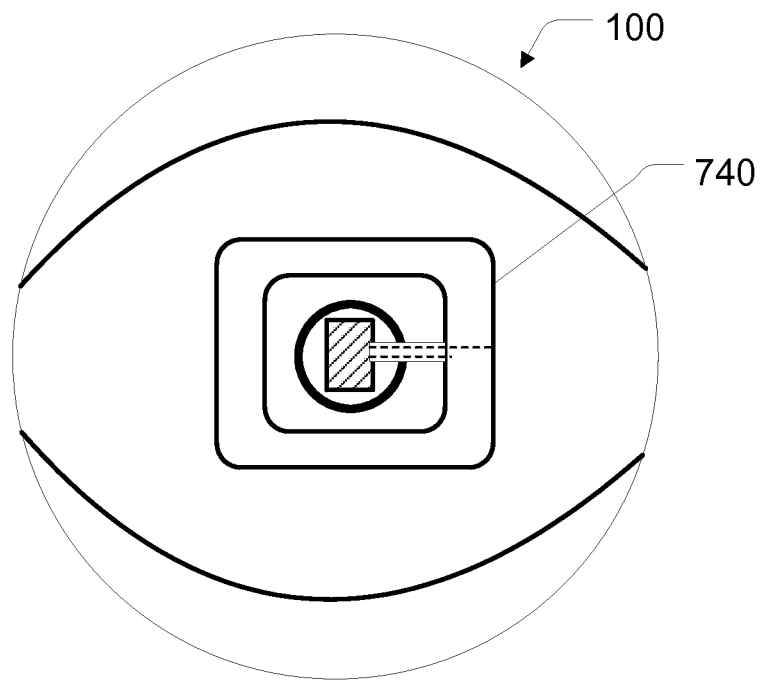

FIG. 7C depicts a third example embodiment of a secondary coil—a circular coil 730. FIG. 7D depicts a fourth example embodiment of a secondary coil—a square coil 740. Both of these designs are flexible in that they can either have a larger outer size with a narrower active coil region, or a smaller outer size and have a wider active coil region (while maintaining a similar total surface area). Both configurations are well suited for efficient coupling with a primary coil.

Figure 8:
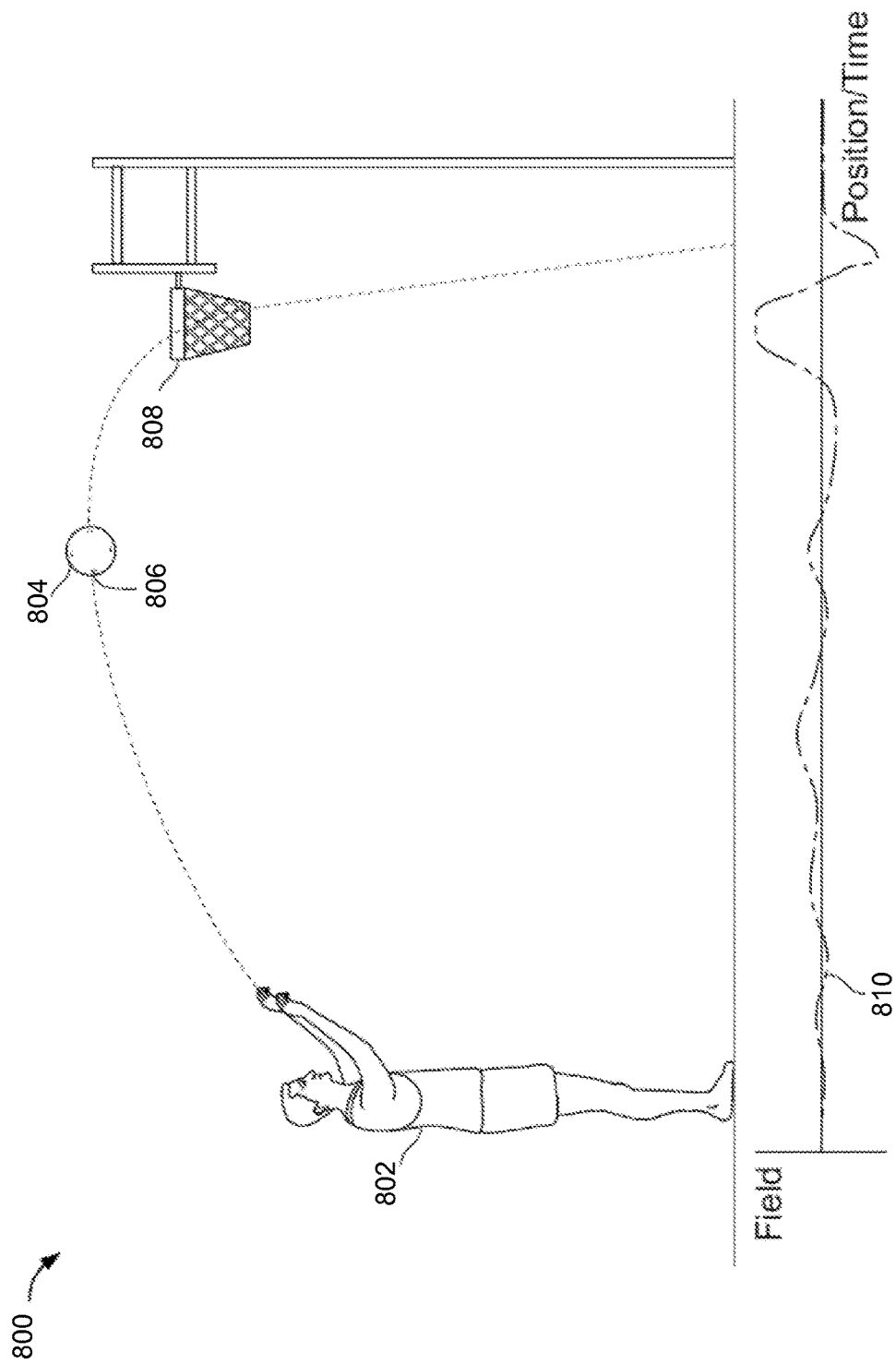
FIG. 8 shows a scenario for tracking scoring electronically in a basketball game.

FIG. 8 shows a scenario 800 for tracking scoring electronically in a basketball game. The view here is an elevation view of a single player 802 who has just taken a straightway basketball shot, such as a free throw or a shot from the top of the key. The ball 804 is provided with a number of instruments 806 (e.g., coils, magnetometers, or other field sensing devices) for sensing a magnetic field through which the ball passes. That magnetic field may be created by a structure outside the ball 804 (e.g., the earth and other sources), or by electronic structures inside the ball 804, which structures may include instruments 806. For example, coils may be printed or otherwise installed inside of the ball 804, such as to an interior surface of a rubber bladder in the ball 804 or may be inside the layer of the bladder itself so as to protect the instruments from failure even as the flex with each bounce of the ball 804. Four of the instruments 806 are shown here as an example, but a variety of numbers of instruments 806 may be employed, and they may be applied in a predetermined pattern, such as at ordinal axes of the ball (e.g., in six locations). Such an array may be used to better sense the presence and location of a field (e.g., to determine whether the ball, when it passed a basketball hoop 808, went through the hoop 808 or next to it).

A graph 810 of field strength sensed by the instruments 806 against time or location (which are the same here, since the motion is from left to right along with time), shows an example (for illustration only) of the sensed field strength. Such strength may be from a single sending structure, or a combination of multiple such structures. The particular approach for capturing the signals, and the approach for processing them will depend on the particular implementation and implementation goals. As can be seen, the field is relatively constant throughout the main arc of the ball, because the ball is far away from anything electric or magnetic (other than the earth). However, as the ball 804 passes through the hoop 808, the field spikes, first in one polarity, and then in another polarity, as the metal hoop 808 approaches the ball 804 and retreats from the ball 804 (as the ball 804 falls to the floor), and then settles down again.

The signal may be monitored as the ball 804 is in play (e.g., the electronics in the ball 804 can be activated by bouncing the ball 804 to trigger a switch inside the electronics in the ball 804, and the ball 804 may go into a super lower-powered sleep mode after a predefined period of inactivity), with a system looking for such a spike in the field around the ball 804. The monitoring and the detection of a scoring event may occur via electronics on the ball 804 itself, or the field data may be transmitted form the ball 804 to a separate computer (not shown) that may analyze the data shown here, and other data form the device such as motion data (e.g., from accelerometers and gyros). From the analysis, an event may be triggered to indicate a score or a miss, and the event may be aligned with a timeline of the sporting event, such as to a timeline whose base is a game clock time for the sporting event.

In this example, the hoop 808 is not instrumented. In other example, electronics connected to the hoop 808 may sense the scoring event, such as by providing a magnetic metal in the ball 804, and sensing changes in a field around the hoop 808 (e.g., by placing small coils around an inner surface of the hoop and connecting them to sensing electronics).

Figure 9A:
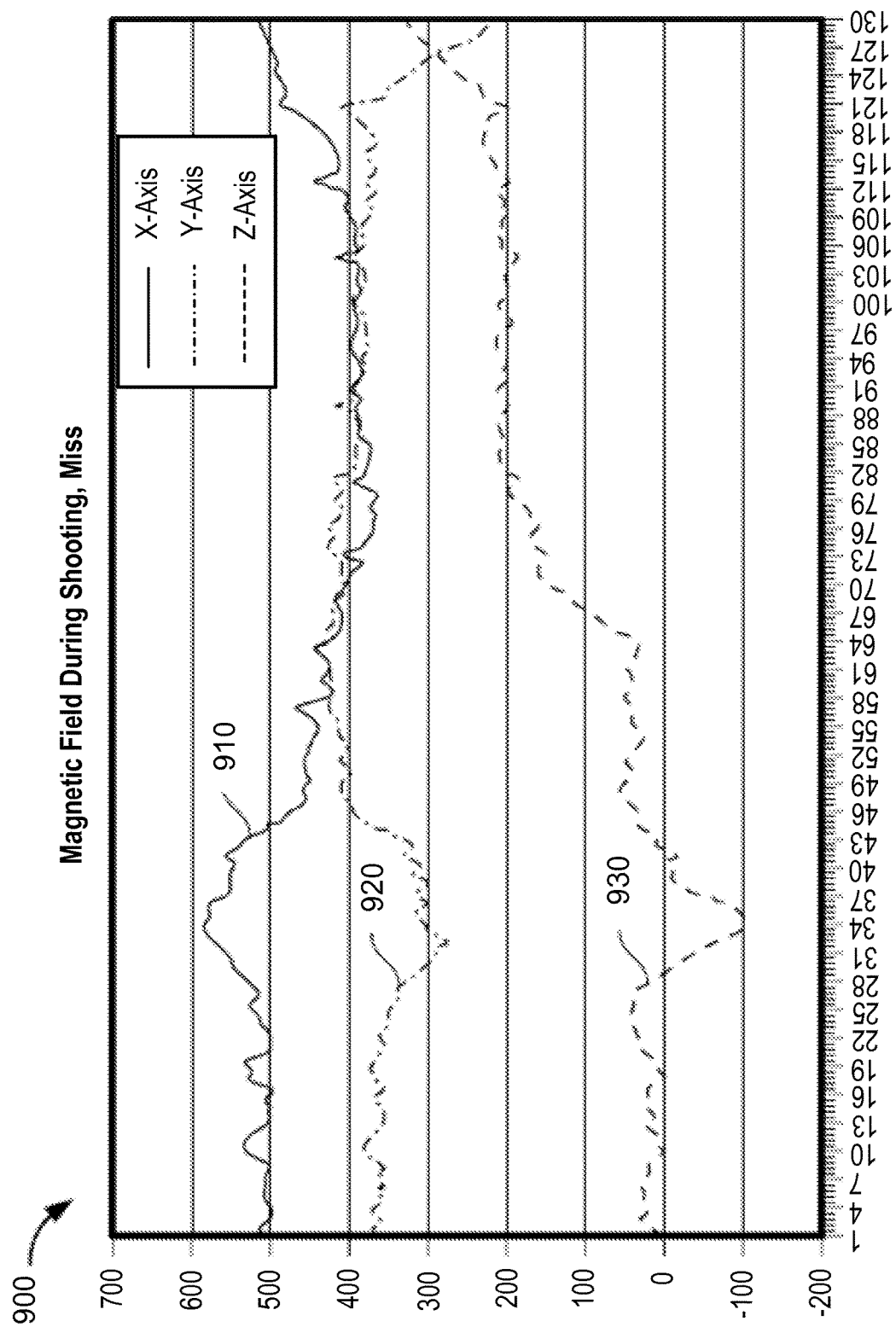
FIG. 9A show a graph of field strength around a basketball during flight and missing a goal.
Figure 9B:
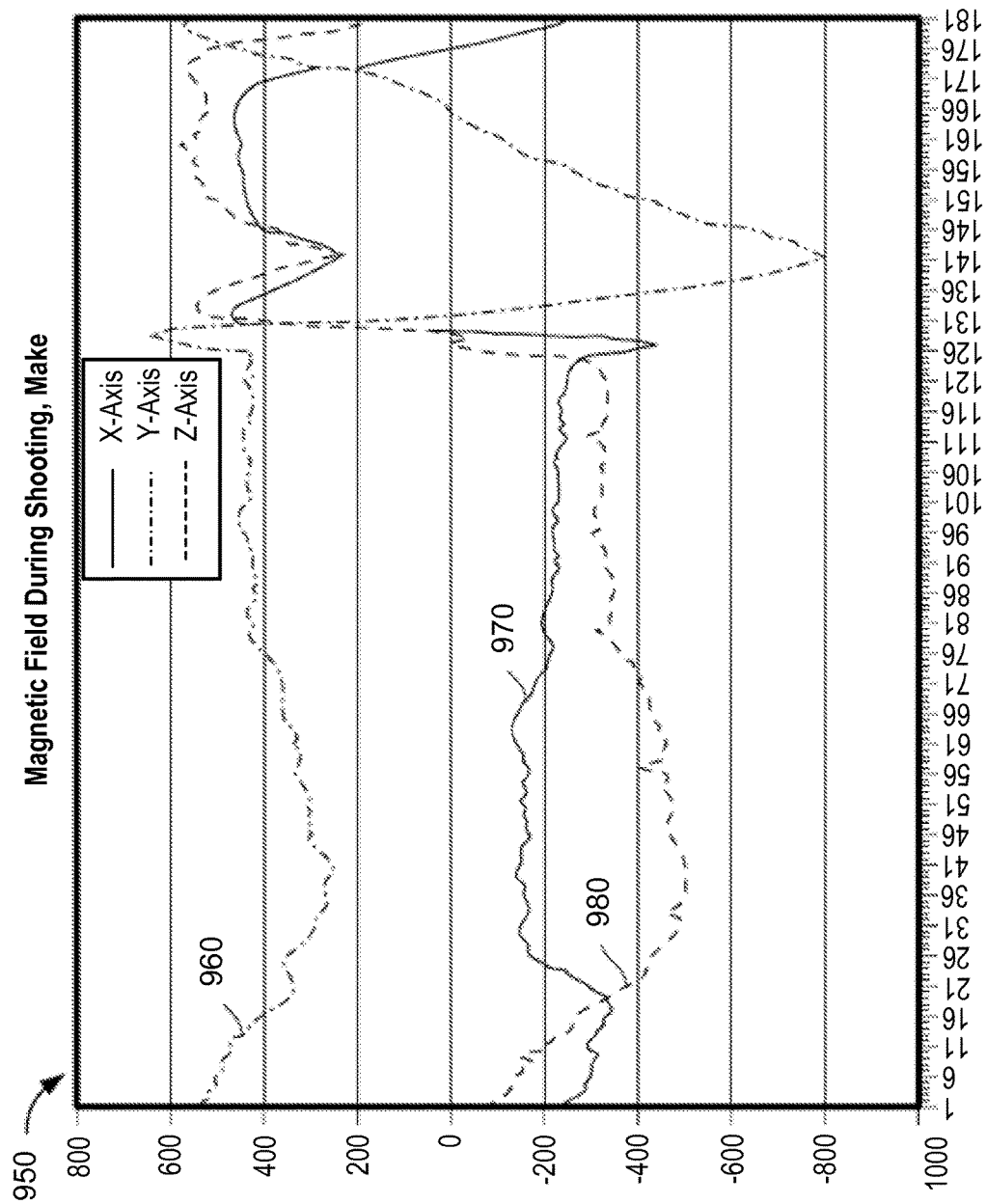
FIG. 9B show graph of field strength around a basketball during flight and making a goal.

FIGS. 9A and 9B shows graphs of field strength around a basketball during flight and as the ball passes by or through a goal. The graphs show actual measured values over time as a shot is taken and made or missed. In these examples, field sensors (e.g., coils or magnetometers) were placed on all three axes of the ball.

In the example of FIG. 9A, a missed shot is shown. Although there was some change in the electromagnetic field sensed by each sensor axis, the change was minimal. This minimal change may be interpreted as that the ball did not pass through or even closely proximate to the hoop.

In the example of FIG. 9B, a made shot is shown. Two of the axes 970 and 980 show an abrupt change followed by a return to stasis, while the other axis 960 shows a change that is time-aligned with the other two 970 and 980 but is in the other direction of polarity. Such a change pattern may indicate that one of the sensors was on an opposite side of the ball as another (and thus had the hoop on its opposite side also). This pattern may therefore be interpreted as that the ball passed through the hoop.

Figure 10:
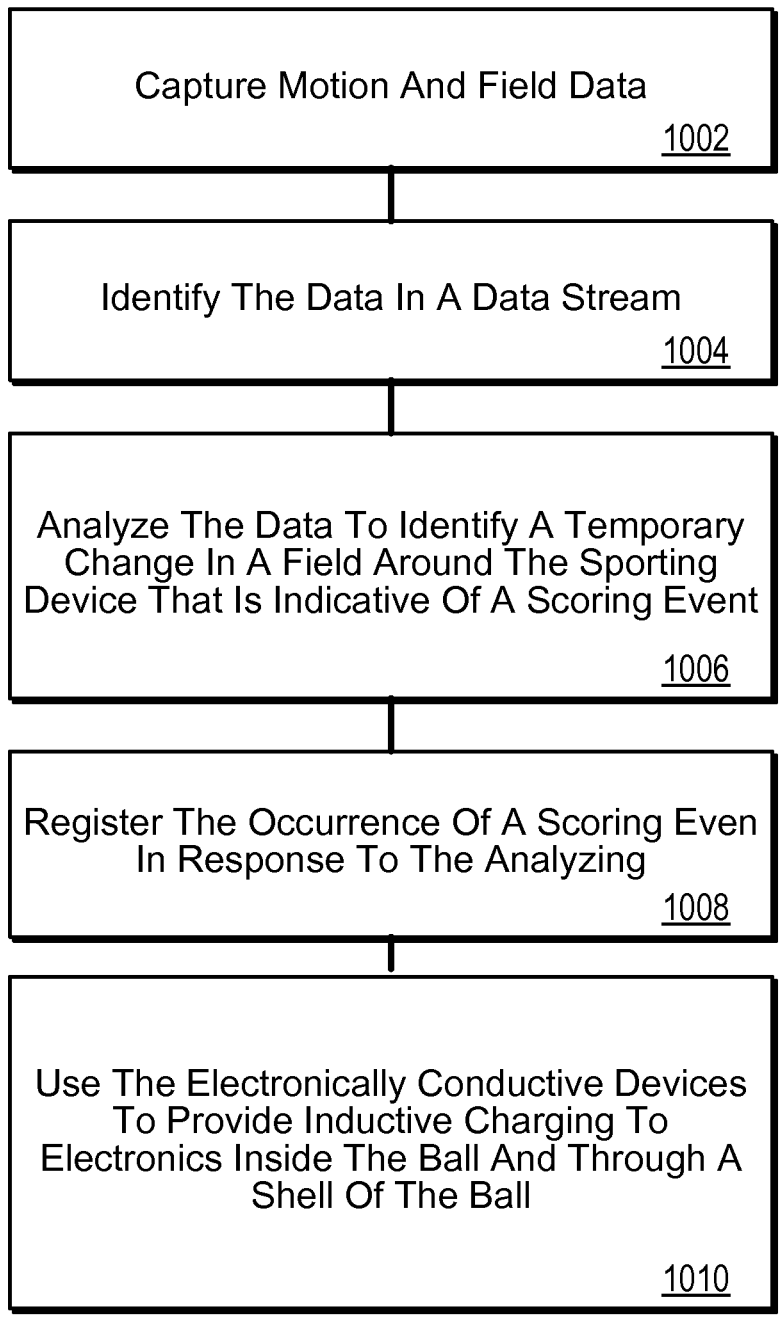
FIG. 10 is a flow chart of a process for registering scoring events using an instrumented game ball.

FIG. 10 is a flow chart of a process for registering scoring events using an instrumented game ball. The process begins at box 1002, where motion and field data are captured. For example, an electronics package in a ball may continuously capture data from electric field sensors, magnetometers, angular rate sensors, accelerometers, gyros, and other appropriate sensors and may wirelessly transmit it to a form of wireless access point that is away from the ball but near an arena or court where a sporting event (e.g., a basketball game or scrimmage) is occurring. The data may be streamed to a computer that is executing a data analysis program for making sense of the data coming from the ball.

At box 1004, data in the data stream is identified that represents each of the various parameters being measured. For example, accelerometer and gyroscope data may be combined to identify particular motion characteristics for the ball.

At box 1006, the process analyzes the data to identify a temporary change in a field around the sporting device that is indicative of a scoring event. Such analysis can occur while the system is analyzing other parameters to identify other events that occur with respect to the ball, such as bounces on a floor, receipt and disposition of the ball by a player (to indicate a dribble or a pass), and the like. The presence of a scoring event may be identified initially by a sudden change in electrical or magnetic field sensed by electronics in the ball, and may be confirmed by matching the profile of the change to a known profile for a scoring or near-scoring event. Also, a bounce of the ball off the rim can be determined by a particular shape of magnetic field signal and a sudden change in direction of the ball (as indicated by accelerometers).

At box 1008, the occurrence of a scoring event is registered by the computer system in response to the analyzing. For example, where the field data substantially matches the pattern shown in the image in FIG. 9B, a positive scoring event can be logged, such as by tagging a timeline of the game with a flag for such an event (and separately tagging a number of points represented by the scoring event).

Separately, box 1010 shows an action that can be taken during a break in a sporting event or when the event is complete. In particular, the ball can be "docked" to a communication and inductive charging pad, which may simply be a surface with a structure to hold the ball in place and prevent it from rolling around. Also, a traditional ball rack can be instrumented with electronics that can both communicate with and charge (inductively) the electronics that are inside the balls.

Figure 11:
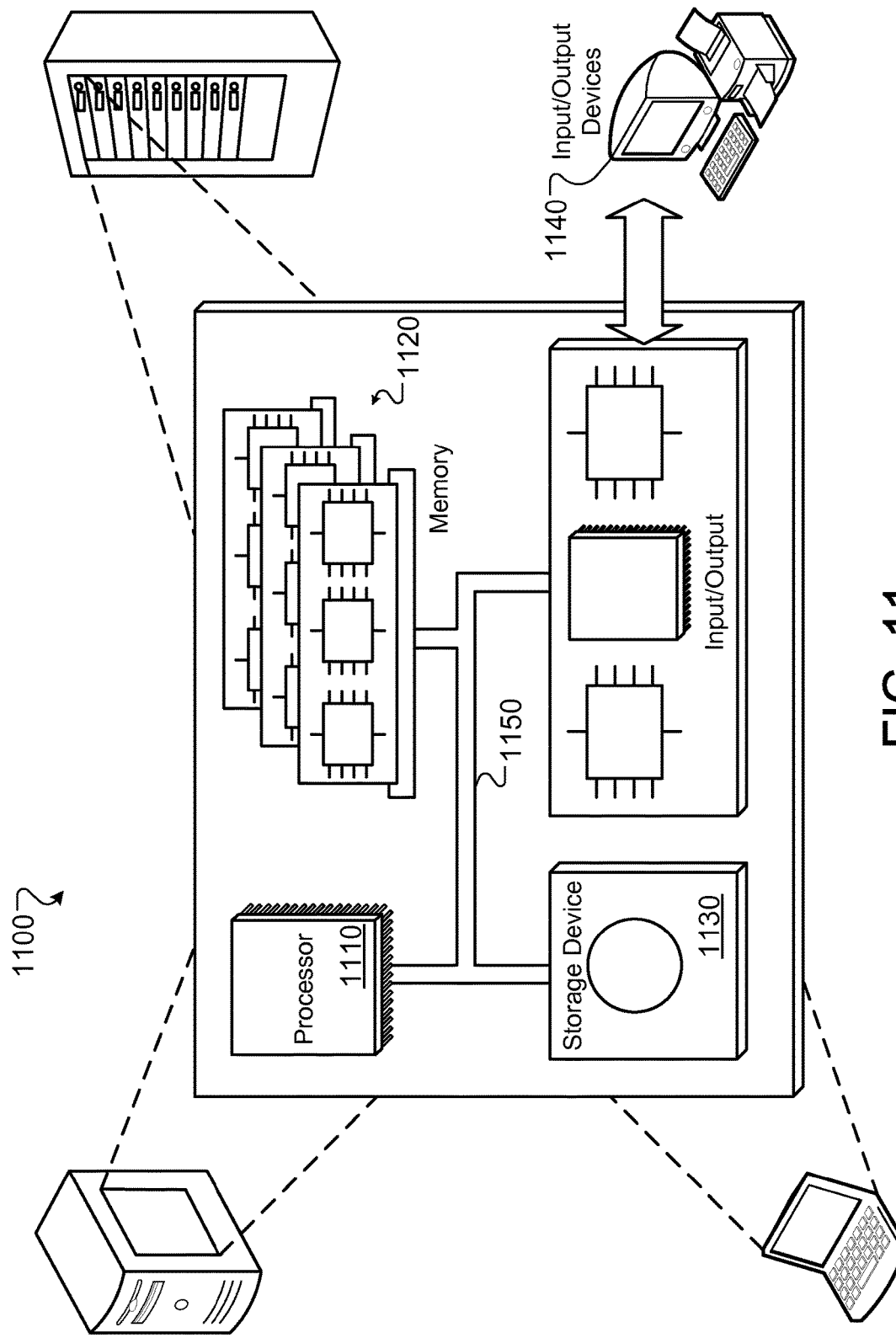
FIG. 11 shows an example of a computer device and a mobile computer device that can be used to implement the techniques described here.

FIG. 11 is a schematic diagram of a computer system 1100. The system 1100 can be used for the operations described in association with any of the computer-implement methods described previously, according to one implementation. The system 1100 is intended to include various forms of digital computers, such as laptops, tablet computers, desktops, workstations, personal digital assistants, servers, blade servers, mainframes, and other appropriate computers. The system 1100 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. The processor may be designed using any of a number of architectures. For example, the processor 1110 may be a CISC (Complex Instruction Set Computers) processor, a RISC (Reduced Instruction Set Computer) processor, a DSP (Digital Signal Processor), or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method, comprising:
   placing on an inductive charging device an athletic ball that comprises a battery, a shell having multiple layers including at least an outermost layer, a middle layer, and an innermost bladder layer, the outermost layer and the middle layer each extending integrally around the entire bladder layer, wherein either the middle layer or the bladder layer have a depression formed in a surface of the layer and a metallic coil set within the depression, and the bladder layer having a pocket holding the battery;
   generating an electric or magnetic field, or both, with the inductive charging device;
   receiving, by the metallic coil energy from the field or fields; and
   charging the battery using the received energy.

2. The method of claim 1, further comprising transmitting data wirelessly from the ball in response to sensing the inductive charging device.

3. The method of claim 1, wherein the one or more coils include a plurality of coils in different hemispheres of the athletic ball so as to enable charging of the battery when the athletic ball is at different rotational angles in relation to the inductive charging device.

4. The method of claim 1, wherein the one or more coils are formed integrally with a flexible printed circuit board.

5. An athletic game ball system, comprising:
- a shell constructed from multiple substantially spherical concentric layers including at least an outermost layer, a middle layer, and an innermost bladder layer, the outermost layer and the middle layer each extending integrally around the entire bladder layer, wherein either the middle layer or the bladder layer have a depression formed in a surface of the layer;
- one or more electronic sensors located within a pocket of the bladder; and
- one or more inductive electric secondary charging coils located within the depression and connected to provide electrical energy to one or more energy storage devices connected to supply power for operating the one or more sensors.

6. The athletic game ball system of claim 5, further comprising a circuit board located within the pocket supporting the electronic sensors and associated circuitry for monitoring motion of the game ball.

7. The athletic game ball system of claim 5, wherein the one or more sensors comprise (i) an accelerometer, (ii) a magnetometer or angular rate sensor, and (iii) a near field communications sensor.

8. The athletic gaming ball system of claim 5, wherein the one or more inductive electric secondary coils include a plurality of coils in different hemispheres of the ball so as to enable charging of the battery when the ball is at different rotational angles in relation to a charging base.

9. The athletic gaming ball system of claim 5, wherein the one or more inductive electric secondary coils are formed integrally with a flexible printed circuit board.

10. The athletic gaming ball system of claim 5, wherein the associated electronics are programmed to identify perturbations in an electric or magnetic field around the ball so as to identify when the ball has passed near a gaming goal.

11. A method of constructing an instrumented athletic game ball, the method comprising:
- providing a ball bladder layer that is part of a shell of the game ball having a pocket;
- providing an electronic sensor package in the pocket;
- providing, outwardly of the ball bladder layer, a substantially spherical middle layer extending integrally around the entire bladder layer and having a depression formed in an outer surface of the middle layer;
- applying within the depression of the surface of the middle layer one or more inductive charging coils;
- connecting the one or more inductive charging coils to the electronic sensor package; and
- providing a substantially spherical outermost layer extending integrally around the entire middle layer.

12. The method of claim 11, wherein at least one of the one or more inductive charging coils is located to surround the pocket in the bladder.

13. The method of claim 11, wherein the electronic sensor package includes a battery for powering components of the electronics sensor package and for receiving electrical charging power from the inductive charging coil.

14. The method of claim 11, further comprising testing charging of the electronic sensor package via the one or more inductive charging coils to verify proper operation of the game ball.

* * * * *